United States Patent
Herath et al.

(10) Patent No.: US 11,700,102 B2
(45) Date of Patent: Jul. 11, 2023

(54) SYSTEM AND METHOD FOR HARQ FEEDBACK IN RRC INACTIVE STATE

(71) Applicants: Sanjeewa Herath, Ottawa (CA); Javad Abdoli, Kanata (CA)

(72) Inventors: Sanjeewa Herath, Ottawa (CA); Javad Abdoli, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 53 days.

(21) Appl. No.: 16/937,823

(22) Filed: Jul. 24, 2020

(65) Prior Publication Data

US 2022/0029768 A1    Jan. 27, 2022

(51) Int. Cl.
*H04L 5/00* (2006.01)
*H04L 27/26* (2006.01)

(52) U.S. Cl.
CPC .......... *H04L 5/0055* (2013.01); *H04L 5/0007* (2013.01); *H04L 5/0042* (2013.01); *H04L 5/0094* (2013.01); *H04L 27/2604* (2013.01)

(58) Field of Classification Search
CPC .............. H04L 27/2604; H04W 76/27; H04W 74/0833
See application file for complete search history.

(56) References Cited

U.S. PATENT DOCUMENTS

| | | | | |
|---|---|---|---|---|
| 11,228,934 B2* | 1/2022 | Jin | ........................ | H04L 5/0094 |
| 2019/0159238 A1* | 5/2019 | Kim | ...................... | H04L 5/0055 |
| 2019/0174480 A1* | 6/2019 | Wong | ................. | H04W 72/0406 |
| 2020/0195387 A1* | 6/2020 | Matsumura | ........... | H04L 1/1854 |
| 2022/0116802 A1* | 4/2022 | Kim | ...................... | H04W 24/08 |

FOREIGN PATENT DOCUMENTS

| | | |
|---|---|---|
| CN | 110120855 A | 8/2019 |
| WO | 2018050094 A1 | 3/2018 |
| WO | 2018062907 A1 | 4/2018 |

OTHER PUBLICATIONS

3rd Generation Partnership Project;Technical Specification Group Radio Access Network; NR; Medium Access Control (MAC) protocol specification (Release 16), 3GPP TS 38.321 V16.1.0 (Jul. 2020).
3rd Generation Partnership Project; Technical Specification Group Radio Access Network; NR; Multiplexing and channel coding (Release 16), 3GPP TS 38.212 V16.2.0 (Jun. 2020).

(Continued)

*Primary Examiner* — Shukri Taha

(57) ABSTRACT

Systems and methods for transmitting uplink control information, for example ACK/NACK, while in RRC_inactive state, are provided. Uplink control information is transmitted while in RRC_INACTIVE state by transmitting a sequence from a set of possible sequences to convey the uplink control information, the transmitted sequence associated with a value of the uplink control information. The sequence is asynchronously transmitted. Signalling may be used to configure a transmission resource within which to transmit the sequence, wherein the transmission resource has a time duration that is longer than a time duration to transmit the sequence. This has the effect of introducing a gap following sequence transmission that can ensure the sequence transmission does not interfere with a data transmission.

20 Claims, 14 Drawing Sheets

(56) References Cited

OTHER PUBLICATIONS

R1-1911092, Qualcomm Incorporated, Procedures for Two-Step RACH, 3GPP TSG-RAN WG1 Meeting #98bis, Chongqing, P.R. China, Oct. 14-20, 2019, total 14 pages.
R2-168051, Samsung, Overall procedure for data transfer in inactive state, 3GPP TSG-RAN WG2 Meeting #6, Reno, USA, Nov. 14 to 18, 2016, total 6 pages.

* cited by examiner

| Sequence Index | 0 | 1 |
|---|---|---|
| Bit Value | 0 | 1 |

FIG. 5A

| Sequence Index | 0 | 1 | 2 | 3 |
|---|---|---|---|---|
| Bit Value | 00 | 01 | 10 | 11 |

FIG. 5B

| Sequence Index | 0 | 1 | 2 | 3 | 4 | 5 | 6 | 7 |
|---|---|---|---|---|---|---|---|---|
| Bit Value | 000 | 001 | 010 | 011 | 100 | 101 | 110 | 111 |

FIG. 5C

| Bits | Purpose/Interpretation |
|---|---|
| 0 | ACK |
| 0 | NACK |

FIG. 5D

| Bits | Purpose/Interpretation |
|---|---|
| 0 | SR (+SR) |
| 1 | No SR (-SR) |

FIG. 5E

| Bits | Purpose/Interpretation |
|---|---|
| 00 | ACK, +SR |
| 01 | ACK, -SR |
| 10 | NACK, +SR |
| 11 | NACK, -SR |

FIG. 5F

| Sequence index | Purpose/Interpretation |
|---|---|
| 000 | +SR, ACK, ACK |
| 001 | +SR, ACK, NACK |
| 010 | +SR, NACK, ACK |
| 011 | +SR, NACK, NACK |
| 100 | -SR, ACK, ACK |
| 101 | -SR, ACK, NACK |
| 110 | -SR, NACK, ACK |
| 111 | -SR, NACK, NACK |

FIG. 5G

| Sequence index | Purpose/Interpretation |
|---|---|
| 000 | +SR, ACK, +Resume |
| 001 | +SR, ACK, -Resume |
| 010 | +SR, NACK, +Resume |
| 011 | +SR, NACK, -Resume |
| 100 | -SR, ACK, +Resume |
| 101 | -SR, ACK, -Resume |
| 110 | -SR, NACK, +Resume |
| 111 | -SR, NACK, -Resume |

FIG. 5H

| Sequence index | Purpose/Interpretation (ACK, Buffer state 2 bits) |
|---|---|
| 000 | ACK, Buffer ++ |
| 001 | NACK, Buffer ++ |
| 010 | ACK, Buffer +- |
| 011 | NACK, Buffer +- |
| 100 | ACK, Buffer -- |
| 101 | NACK, Buffer -- |
| 110 | Reserved |
| 111 | Reserved |

FIG. 5I

| Sequence index | Purpose/Interpretation (ACK, Buffer state, SR) |
|---|---|
| 000 | ACK, Buffer + |
| 001 | NACK, Buffer + |
| 010 | ACK, Buffer - |
| 011 | NACK, Buffer - |
| 100 | ACK, +Resume |
| 101 | NACK, -Resume |
| 110 | Reserved |
| 111 | Reserved |

FIG. 5J

| Bits | Purpose/Interpretation |
|---|---|
| 00 | ACK only |
| 01 | NACK only |
| 10 | ACK with transition request to resumption |
| 11 | NACK with transition request to resumption |

FIG. 5K

| Sequence index | Purpose/Interpretation |
|---|---|
| 00 | ACK only |
| 01 | NACK only |
| 10 | ACK and UE uplink data exist |
| 11 | NACK and UE uplink resumption request |

FIG. 5L

| Sequence index | Purpose/Interpretation |
|---|---|
| 00 | ACK only |
| 01 | NACK and UE uplink resumption request |
| 10 | ACK and UE uplink scheduling request |
| 11 | NACK and UE channel quality indication |

FIG. 5M

SYSTEM AND METHOD FOR HARQ FEEDBACK IN RRC INACTIVE STATE

FIELD

The application relates to wireless communications generally, and more specifically to HARQ mechanisms.

BACKGROUND

In 3GPP NR systems, there are various situations in which a user equipment (UE) may receive data transmissions while in RRC inactive state. However, existing systems do not provide a mechanism for transmitting uplink control information (UCI) in respect of such data transmissions.

SUMMARY

According to one aspect of the present disclosure, there is provided a method comprising: transmitting, by a UE, uplink control information while in RRC_INACTIVE state by: transmitting a sequence from a set of possible sequences to convey the uplink control information, the transmitted sequence associated with a value of the uplink control information.

In some embodiments, the method further comprises: receiving signalling to configure a transmission resource within which to transmit the sequence, wherein the transmission resource has a time duration that is longer than a time duration to transmit the sequence.

In some embodiments, the method further comprises: receiving, by the user equipment (UE) a downlink data transmission while in RRC_INACTIVE state; wherein transmitting a sequence from a set of possible sequences to convey the uplink control information, the transmitted sequence associated with a value of the uplink control information, comprises: transmitting a sequence to indicate a negative acknowledgement (NACK) in respect of the downlink data transmission that is not correctly decoded; or transmitting a sequence to indicate an acknowledgement (ACK) in respect of the downlink data transmission that is correctly decoded; or transmitting a first sequence to indicate a NACK in respect of the downlink data transmission is not correctly decoded and transmitting a second sequence to indicate an ACK in respect of the downlink data transmission is correctly decoded.

Optionally, the set of possible sequences includes N sequences, where N>=4; transmitting a sequence from a set of possible sequences to convey the uplink control information, the sequence associated with a value of the uplink control information comprises: transmitting one of the N sequences to convey $\log_2 N$ bits of uplink control information.

Optionally, the uplink control information is one of: ACK/NACK; Scheduling request; ACK/NACK, scheduling request; ACK/NACK, ACK/NACK, scheduling request; ACK/NACK, scheduling request, RRC state transition change request; ACK/NACK, Buffer state; ACK/NACK, buffer state, scheduling request; ACK/NACK, RRC state transition change request; ACK/NCK, uplink data exists indication/RRC state transition change request; ACK/NACK, RRC state transition change request; ACK/NACK, uplink resumption request or scheduling request or channel quality indication.

In some embodiments, the method further comprises receiving signalling to configure interpretation of bits of the uplink control information, wherein the signaling is one of: UE-specific; Cell specific; UE-group specific.

Optionally, said uplink control information consists of m bits, the method further comprises determining the sequence by: modulating the m bits to produce a modulated symbol; multiplying the modulated symbol with a first sequence to a first set of obtain complex valued symbols; block-wise spreading the first set of complex valued symbols with a first spreading sequence.

In some embodiments, the method further comprises: transmitting a second sequence determined from the uplink control information within a same slot, wherein the second sequence is: the same as the sequence; or determined by multiplying the modulated symbol with a second sequence different from the first sequence to obtain a second set of complex valued symbols, and block-wise spreading the second set of complex valued symbols with said first spreading sequence; or determined by block-wise spreading the first set of complex valued symbols with a second spreading sequence that is different from the first spreading sequence; or determined by multiplying the modulated symbol with a second sequence different from the first sequence to obtain a second set of complex valued symbols, and block-wise spreading the second set of complex valued symbols with a second spreading sequence that is different from said first spreading sequence.

In some embodiments, the method further comprises: receiving signalling indicating a resource partition, the resourced partition having an associated set of sequences; wherein transmitting the sequence comprises transmitting a sequence from within the associated set of sequence that is selected based on a UE identifier of the UE.

In some embodiments, the method further comprises: transmitting the sequence with a subcarrier spacing different from other transmissions in a same resource grid.

According to another aspect of the present disclosure, there is provided a apparatus comprising: a processor and a memory, wherein the apparatus is configured to: transmit uplink control information while in RRC_INACTIVE state by transmitting a sequence from a set of possible sequences to convey the uplink control information, the transmitted sequence associated with a value of the uplink control information.

Optionally, the apparatus is further configured to receive signalling to configure a transmission resource within which to transmit the sequence, wherein the transmission resource has a time duration that is longer than a time duration to transmit the sequence.

Optionally, the apparatus is further configured to receive a downlink data transmission while in RRC_INACTIVE state; wherein the apparatus is configured to transmit a sequence from a set of possible sequences to convey the uplink control information, the transmitted sequence associated with a value of the uplink control information, by: transmitting a sequence to indicate a negative acknowledgement (NACK) in respect of the downlink data transmission that is not correctly decoded; or transmitting a sequence to indicate an acknowledgement (ACK) in respect of the downlink data transmission that is correctly decoded; or transmitting a first sequence to indicate a NACK in respect of the downlink data transmission is not correctly decoded and transmitting a second sequence to indicate an ACK in respect of the downlink data transmission is correctly decoded.

Optionally, the set of possible sequences includes N sequences, where N>=4; the apparatus is configured to transmit a sequence from a set of possible sequences to convey the uplink control information, the sequence associated with a value of the uplink control information by: transmitting one of the N sequences to convey $\log_2 N$ bits of uplink control information.

Optionally, the uplink control information is one of: ACK/NACK; Scheduling request; ACK/NACK, scheduling request; ACK/NACK, ACK/NACK, scheduling request; ACK/NACK, scheduling request, RRC state transition change request; ACK/NACK, Buffer state; ACK/NACK, buffer state, scheduling request; ACK/NACK, RRC state transition change request; ACK/NCK, uplink data exists indication/RRC state transition change request; ACK/NACK, RRC state transition change request; ACK/NACK, uplink resumption request or scheduling request or channel quality indication.

Optionally, the apparatus is further configured to receive signalling to configure interpretation of bits of the uplink control information, wherein the signaling is one of: UE-specific; Cell specific; UE-group specific.

Optionally, said uplink control information consists of m bits, the apparatus further configured to: determine the sequence by: modulating the m bits to produce a modulated symbol; multiplying the modulated symbol with a first sequence to a first set of obtain complex valued symbols; block-wise spreading the first set of complex valued symbols with a first spreading sequence.

Optionally, the apparatus is further configured to: transmit a second sequence determined from the uplink control information within a same slot, wherein the second sequence is: the same as the sequence; or determined by multiplying the modulated symbol with a second sequence different from the first sequence to obtain a second set of complex valued symbols, and block-wise spreading the second set of complex valued symbols with said first spreading sequence; or determined by block-wise spreading the first set of complex valued symbols with a second spreading sequence that is different from the first spreading sequence; or determined by multiplying the modulated symbol with a second sequence different from the first sequence to obtain a second set of complex valued symbols, and block-wise spreading the second set of complex valued symbols with a second spreading sequence that is different from said first spreading sequence.

Optionally, the apparatus is further configured to receive signalling indicating a resource partition, the resourced partition having an associated set of sequences; wherein transmitting the sequence comprises transmitting a sequence from within the associated set of sequence that is selected based on a UE identifier of the UE.

Optionally, the apparatus is further configured to transmit the sequence with a subcarrier spacing different from other transmissions in a same resource grid.

According to another aspect of the present disclosure, there is provided a method comprising: transmitting, by a UE, uplink control information (UCI) while in RRC_INACTIVE state, wherein the transmitting is part of a radio resource control (RRC) resume procedure or part of a physical random access channel (PRACH) process.

Optionally, the method further comprises: while in RRC_INACTIVE state, receiving downlink control information (DCI) to schedule a downlink data transmission; while in RRC_INACTIVE state, receiving the downlink data transmission; wherein the UCI comprises an ACK or a NACK in respect of the downlink data transmission.

Optionally, the method further comprises: the UE triggering the PRACH process and transitioning to RRC_CONNECTED state for every DL data reception.

Optionally, the method further comprises: the UE triggering the PRACH process and transitioning to RRC_CONNECTED state only when downlink data scheduling indicates.

Optionally, the method further comprises: the UE triggering the PRACH process and transitioning to RRC_CONNECTED state only when downlink data informs the trigger indication.

Optionally, the method further comprises: the UE triggering the PRACH process and transitioning to RRC_CONNECTED state when downlink data is of certain size, and otherwise the UE staying in RRC_INACTIVE state.

Optionally, the method further comprises the UE triggering the PRACH process using a specific sequence that is configured for UCI transmission.

Optionally, the method further comprises: the UE triggering the PRACH process as a four step RACH procedure, and including the UCI in message 3 of the four step RACH procedure, the UCI comprising ACK/NACK information.

Optionally, the method further comprises: the UE triggering the PRACH process as a two step RACH procedure and including the UCI in message B of the two step RACH procedure, wherein the UCI comprises ACK/NACK information.

Optionally, the method further comprises: the UE triggering the PRACH process and transmitting UCI after establishing a PUCCH.

Various systems and methods are provided for reporting UCI by a UE in RRC_INACTIVE state. These are used for various purposes including, but not limited to, support of ACK/NACK transmission in response to downlink data, scheduling requests for uplink data, channel quality reporting, buffer state indication, RRC transition requests. In some embodiments, a shared pool of sequences/reference signals is for uplink signaling, UCI and PUCCH. This helps to support a large number of UEs simultaneously. Support for transmission of the UCI in an asynchronous manner is provided through the use of guard period, different CP and sequence sizes/lengths.

BRIEF DESCRIPTION OF THE DRAWINGS

Embodiments of the disclosure will now be described with reference to the attached drawings in which:

FIGS. 5A to 5M are examples of bit interpretations;

DETAILED DESCRIPTION

The operation of the current example embodiments and the structure thereof are discussed in detail below. It should be appreciated, however, that the present disclosure provides many applicable inventive concepts that can be embodied in any of a wide variety of specific contexts. The specific embodiments discussed are merely illustrative of specific structures of the disclosure and ways to operate the disclosure, and do not limit the scope of the present disclosure.

Figure 1:
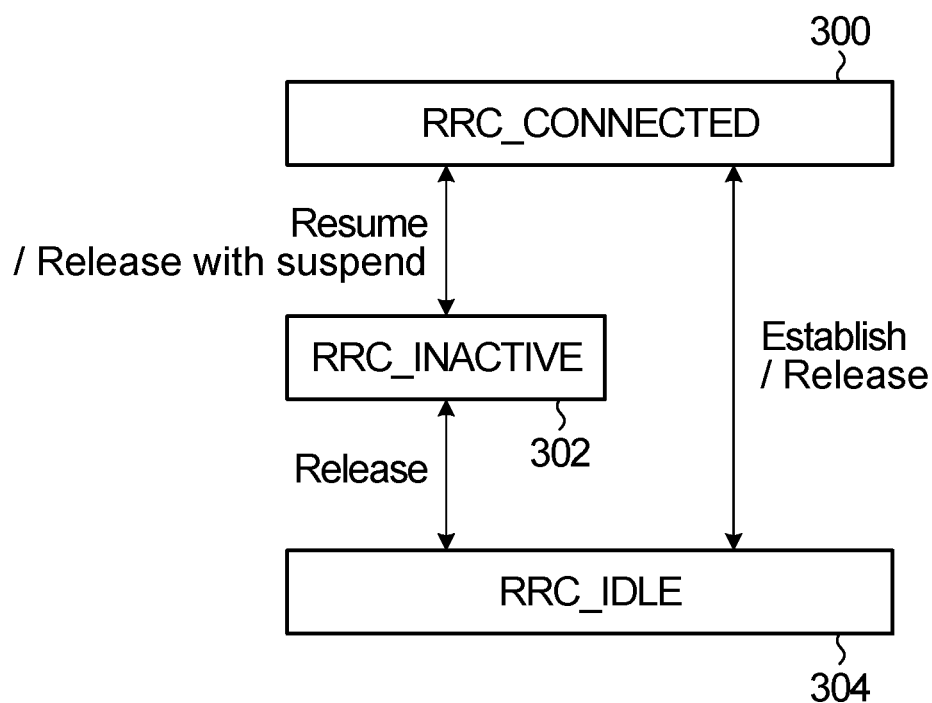
FIG. 1 is an RRC state transition diagram.

With reference to FIG. 1, in 3GPP NR, a user equipment (UE) may operate in one the following three radio resource control (RRC) states: RRC_IDLE 304, RRC_CONNECTED 300, RRC_INACTIVE 302.

While in the RRC_CONNECTED state, a UE is connected to the network (both radio access network (RAN) and core network (CN)) after a connection establishment procedure. The UE monitors short messages, if configured.

While in RRC_IDLE state:
the UE monitors short messages transmitted over downlink control information (DCI) with CRC scrambling by paging-radio network temporary identifier (P-RNTI);
monitors a Paging channel for CN paging using 5G serving—temporary mobile subscriber identity (S-TMSI);
performs neighbouring cell measurements and cell (re-) selection;
acquires system information and can send system information (SI) request (if configured); and
the UE may need to perform initial access procedure to establish a connection to the network and transition from RRC_IDLE to RRC_CONNECTED.

While in RRC_INACTIVE state, the UE:
monitors Short Messages transmitted with P-RNTI over DCI;
monitors a Paging channel for CN paging using 5G-S-TMSI and RAN paging using full inactive RNTI (I-RNTI);
performs neighbouring cell measurements and cell (re-) selection;
performs RAN-based notification area updates periodically and when moving outside the configured RAN-based notification area; and
acquires system information and can send SI request (if configured).

Furthermore, because the transition from RRC_CONNECTED to RRC_INACTIVE is invisible to the CN, an RRC_INACTIVE UE is treated in the same way as being in RRC_CONNECTED state in the sense that the UE-related signalling and data exchange between RAN and CN can be done when a UE is in RRC_INACTIVE state. Also, while in RRC_INACTIVE state, because at least part of UE context, e.g. its security context, is stored in both the UE and the network, the network can have a secure and fast signalling communication with the UE for transition from RRC_INACTIVE to RRC_CONNECTED (or to RRC_IDLE).

The possible RRC state transitions are also shown in FIG. 1. The network can trigger a UE (or a group of UEs) in RRC_IDLE state or RRC_INACTIVE state to transition to RRC_CONNECTED state through the paging mechanism. The transition to RRC_CONNECTED state is done via a contention-based random access procedure. The paging message is transmitted by the network via physical downlink shared channel (PDSCH) scheduled by downlink control information (DCI) with cyclic redundancy check (CRC) scrambled by P-RNTI.

Initial Access in 3GPP NR:

In a cellular system, a limited number of UEs are expected to be in RRC_CONNECTED mode at a given time to keep the scheduler complexity at a reasonable level. In some use scenarios, a UE may transmit data (grant-free or grant-based) while the UE remains in RRC_INACTIVE state without transitioning to RRC_CONNECTED state.

Using the initial access procedure, a UE transitions to RRC_CONNECTED state/mode from RRC_INACTIVE or RRC_IDLE modes. The initial access process is used for many scenarios, for example, RRC Connection re-establishment procedure, transition from RRC_INACTIVE, beam failure recovery etc. A contention based random access (CBRA) procedure can be used to transition the UE to RRC_CONNECTED mode from RRC_IDLE/_INACTIVE. See for example TS 38.300, 9.2.6. The CBRA procedure is shown in the FIG. 2.

Contention free random access (CFRA) is a RRC_CONNECTED mode procedure and CFRA is requested by RRC upon synchronous reconfiguration (e.g. handover). The CRFA procedure is shown in FIG. 3. In both CBRA and CFRA, a random access preamble is transmitted (see FIGS. 2, 3). The preamble is a sequence of symbols transmitted from the UE to the network side. Such sequence of symbols can be low-PAPR such as Zadoff-Chu sequences or computer generated sequences that save UE power.

The initial access procedure transitions the UE to RRC_CONNECTED state and therefore, the UE does not remain in RRC_INACTIVE state. Different events can trigger random access procedure. For example, random access can be initiated by a physical downlink control channel (PDCCH) order received by the UE in DCI, by the UE's medium access control (MAC) entity, or by RRC. As a part of random access procedure, the preamble is transmitted from UE to the network side.

CFRA is an RRC_CONNECTED state procedure initiated by PDCCH order. PDCCH order is triggered by downlink control signaling, i.e., DCI. A UE in RRC_CONNECTED state monitors the PDCCH for DCI format 1_0 where the CRC of the DCI is scrambled by C-RNTI, and the value of the "Frequency domain resource assignment" field is all ones, as specified in 3GPP NR Specification #TS 38.212, section 7.3.1.2.1. This scenario is for random access procedure initiated by a PDCCH order, with all remaining fields set as follows:

Random Access Preamble index—6 bits according to ra-PreambleIndex in Subclause 5.1.2 of 3GPP NR Specification #TS 38.321.

UL/SUL indicator—1 bit. If the value of the "Random Access Preamble index" is not all zeros and if the UE is configured with supplementaryUplink in ServingCellConfig in the cell, this field indicates which UL carrier in the cell to use for transmitting the PRACH according to Table 7.3.1.1.1-1 of 3GPP NR Specification #TS 38.212; otherwise, this field is reserved.

SS/PBCH index—6 bits. If the value of the "Random Access Preamble index" is not all zeros, this field indicates the SS/PBCH that shall be used to determine the RACH occasion for the PRACH transmission; otherwise, this field is reserved.

PRACH Mask index—4 bits. If the value of the "Random Access Preamble index" is not all zeros, this field indicates the RACH occasion associated with the SS/PBCH indicated by "SS/PBCH index" for the PRACH transmission, according to Subclause 5.1.1 of 3GPP NR Specification #TS 38.321; otherwise, this field is reserved.

Reserved bits—10 bits

A UE in an RRC_INACTIVE state does not conventionally monitor the PDCCH for DCI format 1_0 where the CRC of the DCI is scrambled by C-RNTI.

Paging in 3GPP NR:

A UE RRC_INACTIVE or RRC_IDLE state, transitions to RRC_CONNECTED state by initiating the CBRA procedure. During such CBRA procedure, the UE transmits a preamble sequence from UE side to the gNB as part of a state transition, for example, an RRC resume procedure or RRC establish procedure (both depicted in FIG. 1). According to TS38.331 v15.6.0, the network initiates the paging procedure by transmitting the paging message at the UE's paging occasion as specified in TS 38.304. The network may address multiple UEs within a paging message by including one PagingRecord for each UE. Upon receiving the paging message, the UE shall:

1> if in RRC_IDLE, for each of the PagingRecord, if any, included in the Paging message:
2> if the ue-Identity included in the PagingRecord matches the UE identity allocated by upper layers:
3> forward the ue-Identity and accessType (if present) to the upper layers;
1> if in RRC_INACTIVE, for each of the PagingRecord, if any, included in the Paging message:
2> if the ue-Identity included in the PagingRecord matches the UE's stored fullI-RNTI:
3> if the UE is configured by upper layers with Access Identity 1:
4> initiate the RRC connection resumption procedure according to 5.3.13 with resumeCause set to mps-Priority-Access;
3> else if the UE is configured by upper layers with Access Identity 2:
4> initiate the RRC connection resumption procedure according to 5.3.13 with resumeCause set to mcs-Priority-Access;
3> else if the UE is configured by upper layers with one or more Access Identities equal to 11-15:
4> initiate the RRC connection resumption procedure according to 5.3.13 with resumeCause set to highPriority-Access;
3> else:
4> initiate the RRC connection resumption procedure according to 5.3.13 with resumeCause set to mt-Access;
2> else if the ue-Identity included in the PagingRecord matches the UE identity allocated by upper layers:
3> forward the ue-Identity to upper layers and accessType (if present) to the upper layers;
3> perform the actions upon going to RRC_IDLE as specified in 5.3.11 with release cause 'other'.

Also, according to TS38.331 v15.6.0, the paging message in NR Rel-15 has the following fields:

Paging Message [TS38.331 v15.6.0]

```
-- ASN1START
-- TAG-PAGING-START
Paging ::=                    SEQUENCE {
    pagingRecordList                      PagingRecordList
OPTIONAL, -- Need N
    lateNonCriticalExtension              OCTET STRING
OPTIONAL,
    nonCriticalExtension                  SEQUENCE{ }
OPTIONAL
}
PagingRecordList ::=          SEQUENCE (SIZE(1..maxNrofPageRec)) OF
Paging Record
Paging Record ::=             SEQUENCE {
    ue-Identity                   PagingUE-Identity,
    accessType                        ENUMERATED {non3GPP}   OPTIONAL, -- Need
N
    ...
}
PagingUE-Identity ::=                 CHOICE {
    ng-5G-S-TMSI                      NG-5G-S-TMSI,
    fullI-RNTI                    I-RNTI-Value,
    ...
}
-- TAG-PAGING-STOP
-- ASN1STOP
```

In 3GPP NR, a UE monitors a paging search space for a DL control channel (PDCCH) containing paging DCI (i.e. DCI 1_0 with CRC scrambled with P-RNTI). The DCI 1_0 with CRC scrambled with P-RNTI, among other information, contains either a short message or scheduling information for paging or both. If the DCI 1_0 with CRC scrambled with P-RNTI contains scheduling information for paging, a UE at least in RRC_IDLE or RRC_INACTIVE after decoding the DCI proceeds with receiving the scheduled paging message, and if its identity is included in the paging message, it follows the procedure specified above in TS38.331.

DCI 0.1_0 with CRC scrambled by P-RNTI: [TS38.212 v15.6.0]

Short Messages Indicator—2 bits

Short Messages—8 bits

Frequency domain resource assignment—$\lceil \log_2(N_{RB}^{DL,BWP}(N_{RB}^{DL,BWP}+1)/2) \rceil$ bits. If only the short message is carried, this bit field is reserved.

$N_{RB}^{DL,BWP}$ is the size of CORESET 0

Time domain resource assignment—4 bits. If only the short message is carried, this bit field is reserved.

VRB-to-PRB mapping—1 bit. If only the short message is carried, this bit field is reserved.

Modulation and coding scheme—5 bits. If only the short message is carried, this bit field is reserved.

TB scaling—2 bits. If only the short message is carried, this bit field is reserved.

Reserved bits—6 bits

Preamble Sequence in 3GPP NR:

A preamble sequence used in the random access channel is Zadoff-Chu sequence-based and has two lengths: $L_{RA}=139, 839$. In generating the preamble sequence, several parameters are input:

Sequence length
Cyclic shift $C_v$
Sequence number u
The time domain sequence $x_{u,v}(n)$ is given by $$x_{u,v}(n) = x_u((n+C_v) \bmod L_{RA})$$

$$x_u(i) = e^{-j\frac{\pi u i(i+1)}{L_{RA}}}, i = 0, 1, \ldots, L_{RA} - 1$$

The frequency domain representation $y_{u,v}(n)$ is given by $$y_{u,v}(n) = \sum_{m=0}^{L_{RA}-1} x_{u,v}(m) \cdot e^{-j\frac{2\pi mn}{L_{RA}}}$$

Preamble Sequence Pool Generation/Definition:

The preamble is a low-PAPR sequence which is used in both CBRA and CFRA procedures. Preambles are defined in a pool of 64 sequences by:

First by increasing the cyclic shifts of a logical root sequence

Then by increasing the order of the logical root sequence index starting with the index obtained from higher layer parameter prach-RootSequenceIndex Additional preamble sequences, in case 64 preambles cannot be generated from a single root Zadoff-Chu sequence, are obtained from the root sequences with the consecutive logical indexes until all the 64 sequences are found.

Preamble Sequence Pool Generation for Physical Random Access Channel in NR Specification TS38.211:

There are 64 preambles defined in each time-frequency PRACH occasion, enumerated in increasing order of first increasing cyclic shift $C_v$ of a logical root sequence, and then in increasing order of the logical root sequence index, starting with the index obtained from the higher-layer parameter prach-RootSequenceIndex. Additional preamble sequences, in case 64 preambles cannot be generated from a single root Zadoff-Chu sequence, are obtained from the root sequences with the consecutive logical indexes until all the 64 sequences are found. The logical root sequence order is cyclic; the logical index 0 is consecutive to 837 when $L_{RA}=839$ and is consecutive to 137 when $L_{RA}=139$. The sequence number u is obtained from the logical root sequence index according to Tables 6.3.3.1-3 and 6.3.3.1-4.

The parameter prach-RootSequenceIndex is in RACH-ConfigCommon IE which specifies the cell specific random-access parameters [TS 38.331].

In a preamble sequence, a single cyclic prefix (CP) may be inserted for several consecutive symbols. A symbol time is defined providing a guard time for uplink asynchronous UEs so that uplink transmission can better cater to the uplink asynchronous scenarios.

As described earlier, the preamble sequence from the pool of sequences is transmitted as a part of CBRA, CFRA, initial access procedures by a UE in uplink direction in response to, for example, PDCCH order, paging message etc.

PUCCH in 3GPP NR:

Uplink control information (UCI) carries information such as HARQ ACK/NACK, scheduling request (SR), Channel state information (CSI). UCI may be signalled in physical uplink shared channel (PUSCH) or physical uplink control channel (PUCCH). A UE sends UCI through PUSCH or PUCCH while the UE is in RRC_CONNECTED state. While the UE is in RRC states other than RRC_CONNECTED, states such as RRC_INACTIVE and RRC_IDLE, UE does not support PUCCH or PUSCH or both and therefore, UCI is not supported.

For a downlink transmission, a PUCCH resource is configured (DCI bit field PUCCH resource indicator—3 bits). The PUCCH resource specifies PUCCH format.

The UE transmits UCI in a PUCCH using a PUCCH format (format 0-4) when the UE is not transmitting PUSCH and the UE is transmitting UCI (TS 38.213, 9.2.2).

PUCCH format 0 if
the transmission is over 1 symbol or 2 symbols,
the number of HARQ-ACK information bits with positive or negative SR (HARQ-ACK/SR bits) is 1 or 2

PUCCH format 1 if
the transmission is over 4 or more symbols,
the number of HARQ-ACK/SR bits is 1 or 2

PUCCH format 2 if
the transmission is over 1 symbol or 2 symbols,
the number of UCI bits is more than 2

PUCCH format 3 if
the transmission is over 4 or more symbols,
the number of UCI bits is more than 2,
the PUCCH resource does not include an orthogonal cover code PUCCH format 4 if
the transmission is over 4 or more symbols,
the number of UCI bits is more than 2,
the PUCCH resource includes an orthogonal cover code There are several transmit chain functions in PUCCH including sequence hopping, cyclic shift hopping. For example, sequences are used with group and sequence hopping according to RRC signaling configuration PUCCH-ConfigCommon IE (TS 38.331) parameter pucch-GroupHopping values 'neither', 'enable' and 'disable' (TS 38.211, 6.3.2.2). The cyclic shift hopping may be performed where cyclic shift α depends on the cyclic shift hopping in clause 6.3.2.2 of TS 38.211.

PUCCH Format 0

In PUCCH format 0, only 1 or 2 bit feedback is supported where 1 or 2 OFDM symbols are used. In general, the sequence x(n) in PUCCH format 0 can be written as $$x(l \cdot N_{sc}^{RB} + n) = r_{u,v}^{(\alpha,\delta)}(n)$$

$$n = 0, 1, \ldots, N_{sc}^{RB} - 1$$

$$l = \begin{cases} 0 & \text{for single-symbol } PUCCH \text{ transmission} \\ 0, 1 & \text{for double-symbol } PUCCH \text{ transmission} \end{cases}$$

$$\alpha_l = \frac{2\pi}{N_{sc}^{RB}}((m_0 + m_{cs} + n_{cs}(n_{s,f}^\mu, l + l')) \bmod N_{sc}^{RB})$$

where α is the cyclic shift and $\alpha_l$ is the value of α for symbol l. $N_{sc}^{RB}$ is the number of subcarriers per resource block as given in clause 4.4.4.1. Here, $r_{u,v}^{(\alpha,\delta)}(n)$ is given by clause 6.3.2.2 with $m_{cs}$ depending on the information to be transmitted according to subclause 9.2 of [5, TS 38.213].

$n_{s,f}^\mu$ is the slot number in the radio frame l is the OFDM symbol number in the PUCCH transmission where l=0 corresponds to the first OFDM symbol of the PUCCH transmission, l' is the index of the OFDM symbol in the slot that corresponds to the first OFDM symbol of the PUCCH transmission in the slot given by [5, TS 38.213]

$m_0$ is given by [5, TS 38.213] for PUCCH format 0 and 1 while for PUCCH format 3 and 4 is defined in subclause 6.4.1.3.3.1

The function $n_{cs}(n_c,l)$ is given by $$n_{CS}(n_{s,f}^{\mu}, l) = \sum_{m=0}^{7} 2^m c(8 N_{symb}^{slot} n_{s,f}^{\mu} + 8l + m)$$

where the pseudo-random sequence c(i) is defined by subclause 5.2.1. The pseudo-random sequence generator shall be initialized with $c_{init}=n_{ID}$, where $n_{ID}$ is given by the higher-layer parameter hoppingId if configured, otherwise $n_{ID}=N_{ID}^{cell}$.

The sequence x(n) mapping to physical resources is done as follows. The sequence x(n) shall be multiplied with the amplitude scaling factor $\beta_{PUCCH,0}$ to conform to the transmit power specified in TS 38.213. Then, the sequence is mapped starting from x(0) to resource element $(k, l)_{p,\mu}$ according to subclause 9.2.1, TS 38.213 in the increasing order of the index k over the assigned physical resources, then the index/on the antenna port.

PUCCH Format 1

In format 1, the main steps are modulation, sequence multiplication, block-wise spreading, mapping to physical resources (cf. TS 38.211) and some details are provided below.

The block of bits b(0), . . . , $b(M_{bit}-1)$ shall be modulated as described in clause 5.1 using BPSK if $M_{bit}=1$ and QPSK if $M_{bit}=2$, resulting in a complex-valued symbol d(0).

The complex-valued symbol d(0) shall be multiplied with a sequence $r_{u,v}^{(\alpha,\delta)}(n)$ according to $$y(n)=d(0)\cdot r_{u,v}^{(\alpha,\delta)}(n)$$

$$n=0,1,\ldots,N_{sc}^{RB}-1$$

where $r_{u,v}^{(\alpha,\delta)}(n)$ is given by clause 6.3.2.2. The block of complex-valued symbols y(0), . . . , $y(N_{sc}^{RB}-1)$ shall be block-wise spread with the orthogonal sequence $w_i(m)$ according to $$z(m' N_{sc}^{RB} N_{SF,0}^{PUCCH,1} + m N_{sc}^{RB} + n) = w_i(m) \cdot y(n)$$

$$n = 0, 1, \ldots, N_{sc}^{RB} - 1$$

$$m = 0, 1, \ldots, N_{SF,m'}^{PUCCH,1} - 1$$

$$m' = \begin{cases} 0 & \text{no intra-slot frequency hopping} \\ 0, 1 & \text{intra-slot frequency hopping enabled} \end{cases}$$

where $N_{SF,m'}^{PUCCH,1}$ is given by Table 6.3.2.4.1-1. Intra-slot frequency hopping shall be assumed when the higher-layer parameter intraSlotFrequencyHopping is provided, regardless of whether the frequency-hop distance is zero or not, otherwise no intra-slot frequency hopping shall be assumed.

The orthogonal sequence $w_i(m)$ is given by Table 6.3.2.4.1-2 where $i$ is the index of the orthogonal sequence to use according to subclause 9.2.1 of [5, TS 38.213]. In case of a PUCCH transmission spanning multiple slots according to subclause 9.2.6 of [5, TS38.213], the complex-valued symbol d(0) is repeated for the subsequent slots.

TABLE 6.3.2.4.1-1

Number of PUCCH symbols and the corresponding $N_{SF,m'}^{PUCCH,1}$.

| PUCCH length, $N_{symb}^{PUCCH,1}$ | No intra-slot hopping m' = 0 | Intra-slot hopping m' = 0 | Intra-slot hopping m' = 1 |
|---|---|---|---|
| 4 | 2 | 1 | 1 |
| 5 | 2 | 1 | 1 |
| 6 | 3 | 1 | 2 |
| 7 | 3 | 1 | 2 |
| 8 | 4 | 2 | 2 |
| 9 | 4 | 2 | 2 |
| 10 | 5 | 2 | 3 |
| 11 | 5 | 2 | 3 |
| 12 | 6 | 3 | 3 |
| 13 | 6 | 3 | 3 |
| 14 | 7 | 3 | 4 |

TABLE 6.3.2.4.1-2

Orthogonal sequences $w_i(m) = e^{j2\pi\phi(m)/N_{SF,m'}^{PUCCH,1}}$ for PUCCH format 1.

| $N_{SF,m'}^{PUCCH,1}$ | i = 0 | i = 1 | i = 2 | i = 3 | i = 4 | i = 5 | i = 6 |
|---|---|---|---|---|---|---|---|
| 1 | [0] | — | — | — | — | — | — |
| 2 | [0 0] | [0 1] | — | — | — | — | — |
| 3 | [0 0 0] | [0 1 2] | [0 2 1] | — | — | — | — |
| 4 | [0 0 0 0] | [0 2 0 2] | [0 0 2 2] | [0 2 2 0] | — | — | — |
| 5 | [0 0 0 0 0] | [0 1 2 3 4] | [0 2 4 1 3] | [0 3 1 4 2] | [0 4 3 2 1] | — | — |
| 6 | [0 0 0 0 0 0] | [0 1 2 3 4 5] | [0 2 4 0 2 4] | [0 3 0 3 0 3] | [0 4 2 0 4 2] | [0 5 4 3 2 1] | — |
| 7 | [0 0 0 0 0 0 0] | [0 1 2 3 4 5 6] | [0 2 4 6 1 3 5] | [0 3 6 2 5 1 4] | [0 4 1 5 2 6 3] | [0 5 3 1 6 4 2] | [0 6 5 4 3 2 1] |

In format 2-4, main steps are itemized as follows.

PUCCH format 2: Main steps are scrambling, modulation, mapping to physical resources (cf. TS 38.211)

PUCCH format 3/4: Main steps are scrambling, modulation, block-wise spreading, transform precoding, mapping to physical resources (cf. TS 38.211)

For UCI/PUCCH, channel coding is performed. Channel coding for UCI/PUCCH larger than 11-bit code blocks by polar code and smaller code blocks (1-11 bits) by Section 5.3.3/6.3.1.3 in TS 38.212.

A UE that is in RRC_INACTIVE state may receive downlink data from the network e.g. from a base station (BS) or gNB. However, there is no mechanism to report/feedback such as a HARQ ACK/NACK indication regarding the status of the downlink data received from the network.

As described earlier, currently the only form of uplink transmission supported in RRC_INACTIVE state is physical random access channel (PRACH). Moreover, in general, physical uplink control channel (PUCCH) transmission is not supported in RRC_INACTIVE state. Consequently, other mechanisms such as uplink scheduling requests (SR), channel state information (CSI) reporting, and buffer state indication/reporting are not supported in RRC_INACTIVE state. Moreover, other information such as an indication of intention to transition to RRC_CONNECTED/RRC_IDLE states, which may be useful for the network side, is not supported in RRC_INACTIVE state.

Although some mechanisms such HARQ, SR, CSI, buffer state are supported for a UE in RRC_CONNECTED state, there are numerous reasons that such RRC_CONNECTED state mechanisms do not work in RRC_INACTIVE state. For example, PUCCH/UCI are more suitable for RRC_CONNECTED state, in which case the UE is uplink synchronous. This is because if a UE is using a portion of a resource grid (e.g. one or two OFDM symbols in Format 0) for UCI/PUCCH, then to avoid/minimize interference to other transmissions, tight synchronization of uplink transmission should be maintained. However, uplink synchronization is unrealistic for a UE in RRC_INACTIVE state. A UE establishes uplink synchronization by estimating timing advance (TA), usually by performing a PRACH process. A PRACH process transitions the UE to the RRC_CONNECTED state and as such, there does not exist a mechanism for a UE to establish uplink synchronization while maintaining the UE in RRC_INACTIVE state. Furthermore, the number of UEs expected to be in RRC_INACTIVE state is large compared to a smaller number of UEs expected to be in RRC_CONNECTED state. A technology/method that enables a UE in RRC_INACTIVE state to transmit uplink control information (UCI)/PUCCH would need to support a large number of UEs. However, current PUCCH in RRC_CONNECTED state uses resources that are dedicated to each UE. In other words, the network side assigns physical resources to the UE to be used as PUCCH. For example, DCI scheduling downlink data carries information indicating which resources are to be used for HARQ purposes. For a large number of UEs, this dedicated assignment is resource inefficient and also complex for implementation. As such, state-of-the-art PUCCH design is more suitable for uplink synchronous transmission and/or for a smaller number of UEs.

Embodiment 1: Uplink Control Information Reporting without Transitioning to RRC_CONNECTED State In a first set of embodiments, a UE transmits UCI in the uplink while the UE remains in RRC_INACTIVE state.

In this option, the UE transmits UCI while in RRC_INACTIVE state by transmitting a sequence of symbols from a set of possible sequences to convey the UCI. The transmitted sequence is associated with a value of the uplink control information. Numerous specific embodiments featuring the use of sequences to convey UCI indication are provided below.

In this option, a pool of sequences may be defined. The sequences in the pool may cater to uplink asynchronous transmission which may include guard period, sequences with longer time duration and small subcarrier spacing.

Resources used to transmit the sequence can be defined and/or configured on an implementation specific basis. For example, the sequence may be transmitted using a channel similar to a physical random access channel (PRACH). This approaches has the advantage of less overhead and complexity for the network side as compared with transitioning to RRC_CONNECTED state for the purpose of UCI signaling. However, because the UE remains in RRC_INACTIVE state, the capabilities of the UE are restricted or limited. Detailed embodiments will now be described.

Embodiment 1.1 ACK/NACK Indication by Sequence Transmission

In this embodiment, a UE transmits one or more sequences for ACK/NCK indication and/or other uplink control information while the UE remains in RRC INACTIVE state.

Alternative 1: in a first alternative, a UE transmits a sequence to indicate a NACK in respect of a downlink (DL) transmission that is not correctly decoded; otherwise, the UE does not transmit a sequence. If the BS/gNB does not receive a sequence within a specified time duration, this is considered as ACK. This approach is suitable when DL data transmission reliability is higher priority and the BS/gNB can take measures to increase the likelihood of successful packet delivery. This approach has the advantage of saving the overhead to transmit an ACK.

Alternative 2: in a second alternative, a UE transmits a sequence to indicate an ACK in respect of a DL transmission that is correctly decoded; Otherwise, the UE does not transmit a sequence. If the BS/gNB does not receive a sequence within a specified time duration, this is considered a NACK. This approach has the advantage of saving the overhead to transmit a NACK overhead. This allows more UEs to share the sequence pool.

Alternative 3: in a third alternative, the UE transmits a first sequence to indicate a NACK in respect of a DL data transmission and otherwise the UE transmits a second sequence to indicate an ACK in respect of the DL data transmission.

Alternative 4: in a fourth alternative, the UE transmits a sequence from a larger group of possible sequences to convey various forms of uplink control information that may include ACK/NACK and/or other information. Where N is a number of sequences being transmitted, this approach can be used to convey $\log_2 N$ bits of information. $N \geq 4$ to allow carrying at least two bits of uplink control information. Bit interpretation can be configured and/or pre-specified.

The set of possible sequences may be multiple indices from a pool and/or use different roots, cyclic shifts of the same index or multiple indices etc. See Embodiment 1.4 below for detailed examples.

The uplink control information conveyed using Alternative 4, may, for example, be one or more from the following list:
ACK/NACK information
UE buffer state indication
UE uplink grant/scheduling requests
UE requests to transition/change RRC state (e.g. Request to transition to RRC_CONNECTED state)
UE channel state information/channel quality indication
For Alternatives 1, 2, 3, 4 of Embodiment 1.1:
NACK may or may not trigger a downlink re-transmission by the BS/gNB
the BS/gNB may schedule re-transmission based on redundancy version (RV).
NACK may trigger the UE to transition to RRC_CONNECTED state (UE implied trigger). In this case, when the UE sends the NACK to the network side, the UE also initiates the process to transition to RRC_CON- NECTED state. In one example, the transmission of downlink data or the transmission of scheduling information for downlink data includes an indication that the UE should transition to RRC_CONNECTED state upon NACK transmission. This configuration received can be considered as explicit configuration to transition to RRC_CONNECTED state triggered as a result of the NACK. In another example, the UE behavior, i.e., transition to RRC_CONNECTED state or not (from current RRC_INACTIVE/RRC_IDLE state), is configured during RRC_CONNECTED state before transitioning to RRC_INACTIVE/RRC_IDLE state or may be configured during release with suspend procedure/release procedure (c.f. FIG. 1). This scenario can be considered as prior configuration of RRC_CONNECTED state transitioning behavior triggered by the NACK.

Upon receiving a NACK, the BS/gNB may send (and UE will receive) a trigger to transition to RRC_CONNECTED state (RRC resumption trigger). Options for RRC resumption trigger can be UE paging (as described earlier or otherwise), UE downlink control information, downlink data transmission etc.

More generally, the UE is able to indicate ACK/NACK and UCI without transitioning to RRC_CONNECTED state.

Embodiment 1.2: Bit Interpretation in Sequence Transmission

In order to use multiple sequences to convey UCI or ACK/NACK information, a mapping of N sequence indices to $\log_2(m)$ bits is specified. For example, where there are 2 sequences, these can convey one bit, 4 sequences can convey 2 bits, and 8 sequences can convey 3 bits. Examples of mappings of sequence index to bit values to convey one, two and three bits are shown in FIGS. 5A, 5B, and 5C respectively.

FIGS. 5D to 5M contain specific examples of sets of information containing one, two or three bits that can be conveyed using a sequence from a set of sequences:

FIG. 5D: ACK/NACK: 1 bit;
FIG. 5E: SR request or does not request (+SR/− SR, respectively): 1 bit
FIG. 5F: ACK/NACK, +/− SR: 2 bits
FIG. 5G: ACK/NACK, ACK/NACK, +/− SR: 3 bits
FIG. 5H: ACK/NACK, +/− SR, Resumption request or does not request resumption: 3 bits
FIG. 5I: ACK/NACK, Buffer state (2 bits): 3 bits
FIG. 5J: Selected choices of ACK/NACK, buffer state, Resumption request and some bit combinations reserved: 3 bits
FIG. 5K: ACK/NACK, transition request to resumption (2 bits)
FIG. 5L: ACK/NACK, uplink data exist/UE uplink resumption request (2 bits);
FIG. 5M: Selected choices from ACK/NACK, uplink resumption request or scheduling request or channel quality indication (2 bits).

In the above examples, references to SR+/SR− refer to two states of a scheduling request. More generally, the UCI may include scheduling request information in a format understood by both the transmitter and receiver. The examples also refer to specific state transitions, for example transition request to resumption. More generally, the UCI may include RRC state transition change indicators. While the above examples show specific numbers of bits to convey the indicated types of information, it is possible that different numbers of bits may be used to convey the same information.

In some embodiments, the interpretation of bits (i.e. what information is conveyed by a set of UCI bits) is UE specific. This may be configured by the BS/gNB while in RRC_CONNECTED state or during RRC suspension. As a result, one UE can have one interpretation while another UE may interpret the bits differently. In some embodiments, one UE can have a different number of UCI bits than another UE.

In some embodiments, the interpretation is cell specific. In this case the interpretation may be commonly configured, or prespecified. This cell specific configuration may occur by the BS/gNB while in RRC_CONNECTED state or during RRC suspension.

In some embodiments, the interpretation is UE group specific, in the sense that a group of UEs use the same interpretation. For example, all UEs in RRC_INACTIVE state may have a common interpretation. In another example, a group of UEs can be specified based on a UE identifier such as full-RNTI or PagingUE-Identity. One such approach is to define UE groups based on the pre-specified range of IDs. Another approach is to define a group of UEs by grouping the UEs whose mod(UE identifier, group size) value is the same (mod(,) represents the modulo operation). Again, the group specific configuration may occur by BS/gNB while in RRC_CONNECTED state or during RRC suspension.

Embodiment 1.3: Sequence Pool Generation

In this embodiment, in order for UEs to share sequences, a sequence/reference signal pool is defined. A UE uses one or more sequences from the pool for UCI transmission. These may be assigned to the UE by RRC signaling (before transitioning to RRC_INACTIVE state), during RRC suspension procedure, or as part of downlink data scheduling or other means to assign or configure which sequences should be used by the UE.

In some embodiments, a pool of sequences is defined and a UE selects one or more than one sequence(s) from the pool for UCI. Sequence selection by a UE may be based on configurations (configured in RRC_CONNECTED state/during suspension procedure). Alternatively, the sequence selection may be predefined.

The sequence pool is created in a manner that is suitable for use by UEs in RRC_INACTIVE state. The pool may be defined to have a size that is suitable to support a larger number of UEs. This may be achieved by using different length sequences, different cyclic shifts, different roots of the sequence. To support asynchronous uplink transmission, a guard period and/or long CP can be supported. See embodiment 1.5, 1.6 for details. To enhance coverage, a large CP and/or smaller sub-carrier spacing can be supported. To support mobility, a larger sub-carrier spacing can be supported.

The following is a non-limiting set of sequence pools that may be used for UCI transmission:

Existing sequences defined for preamble transmission (see for example, the 64 sequences in TS 38.211 v15.7.0);

sequences defined for uplink reference signal transmission, such as sounding reference signal (SRS); see for example commonly assigned U.S. application Ser. No. 16/723,403 hereby incorporated by reference;

low-PAPR sequences such as Zadoff-Chu (ZC) sequences or computer generated sequences including sequences in section 5.2 TS 38.211 v15.7.0, sequence modulation similar to section 6.3.2.4 TS 38.211 v15.7.0;

Sequences/signals based on modulation, scrambling, sequence multiplication, block-wise spreading or combinations thereof; detailed examples given below; also PUCCH Format 0-4; may be used Pseudonoise (PN) sequences (Eg. Section 5.2.1 TS 38.211 v15.7.0);

specific new sequences defined herein for this purpose (see, e.g. Embodiments 1.3.1-1.3.3 described below).

A sequence pool can handle most of the issues of UCI signaling including asynchronous transmission, and support for a large number of UEs.

Embodiment 1.3.1: SRS Pool Generation

A SRS sequence pool generation for RRC_INACTIVE state can be similar to application Ser. No. 16/723,403, hereby incorporated by reference. The RRC parameters for sequence generation (eg. SRS-Config IE) to be used in SRS sequence generation can be followed similar to the approach from the above-referenced U.S. application Ser. No. 16/723, 403. In some embodiments, group hopping and sequence hopping can be used. UE specific cyclic shifts for a sequence can be assigned.

In some systems, different cyclic shifts are assigned for multiple antenna ports. To reduce complexity, in some embodiments, SRS in RRC_INACTIVE is restricted to a single antenna port.

For the purpose of UCI transmission using SRS sequences within an SRS sequence pool, the SRS sequence pool is indexed. The following is a set of example options:

Option 1: There are N SRS defined, enumerated in increasing order of increasing cyclic shift $\alpha_i$ of a group u and sequence v.

Option 2: There are N SRS defined, enumerated in increasing order of first increasing cyclic shift $\alpha_1$ of a group u, and then in increasing order of the group u, starting with the index obtained from the higher-layer parameter srs-StartIndex $u_0$ (a new parameter in SRS-Config IE for RRC_INACTIVE).

Option 3: There are N SRS defined, enumerated in increasing order of first increasing cyclic shift $\alpha_1$ of a group u, and then in increasing order of the group u, and then increasing order of sequence v starting with the index obtained from the higher-layer parameters group index srs-StartGroupIndex $u_0$ and srs-StartSequenceIndex $v_0$ (a new parameter in SRS-Config IE for RRC_INACTIVE).

Option 4: Other options for defining SRS sequence pool for RRC_INACTIVE can be achieved by using the parameters specified in SRS-Config IE. For example, the SRS index may consist of one or more parameters in SRS-Config and others, for example SRS Resource Set ID, SRS Resource ID etc. A table can be used to define the sequence index in the pool against the SRS parameters.

Where the SRS pool size is 64, an SRS index can be represented/signalled by 6 bits. More generally, where the SRS pool size is M, $\log_2$ M bits can be used for the SRS index.

Embodiment 1.3.2

In another embodiment, a pool of indexed preamble sequences can be used for RRC_INACTIVE state UCI signaling. A set of options is presented below.

Option 1: The pool of preamble sequences is the same as the sequence pool in the physical random access channel.

Option 2: The pool of preamble sequence is a sub-set of the sequence pool in the physical random access channel. For example, indices for a UE pool for RRC_INACTIVE of size N can be obtained by (i+UE_ID) mod N where i is the index of the sequence pool in the physical random access channel and UE_ID is a UE specific identifier such as I-RNTI or an identifier signaled through RRC signaling.

Option 3: Other options for defining a pool of preamble sequence involve using the parameters specified in RACH-ConfigCommon, RACH-ConfigGeneric, RACH-ConfigDedicated IEs and others, for example, PRACH-ConfigurationIndex etc. For example, the preamble index may consist of one or more parameters in PRACH-ConfigurationIndex in RACH-ConfigGeneric and prach-RootSequenceIndex in RACH-ConfigCommon etc. A table may be used to define the pool index against the sequence parameters.

Where the preamble sequence pool size is 64, a preamble sequence index can be represented/signalled by 6 bits. More generally, where the preamble sequence pool size is M, $\log_2$ M bits can be used for the preamble sequence index.

The mapping of sequence to index can be functional, for example, root index=mod(UE_Identity, pool size) and cyclic shifts for different bits. For example, N cyclic shifts of a given ZC root is assigned/obtained by UE for uplink transmission to indicate $\log_2$ N bits.

The mapping can be based on UE ID (full I-RNTI, NG-5G-S-TMSI etc), system frame, slot number etc. (e.g. DL data receiving), other configurations/parameters. Such configurations are signaled to UE during RRC_CONNECTED state or during RRC suspension procedure.

Embodiment 1.3.3: Modulated Sequence Pool Generation

In some embodiments, a modulated sequence pool is generated using the following method:

Step 1: Modulate a block of m bits using a modulator such as BPSK, QPSK, $2^m$-QAM to produce a modulated symbol;

Step 2: Multiply the modulated symbol with a sequence such as a low peak average power ratio (PAPR) sequence, (for example a sequence such as described in section 5.2.2 in TS 38.211 v15.7.0) and obtain complex valued symbols y;

Step 3: Block-wise spread y with spreading sequences w. Spreading sequences can be orthogonal;

Step 4(a): the m bits are transmitted by transmitting the output of step 3 in one symbol within a slot. Alternatively, the m bits are transmitted multiple times, in multiple symbols within a slot. This can involve repeating the same sequence or hopping to a different sequence in step 2, repeating the same spreading sequence or hopping to a different spreading sequence in step 3, or hopping to both a different sequence in step 2 and a different spreading sequence in step 3;

Step 4(b): Where the m bits are transmitted multiple times as per Step 4(a), intra slot frequency hopping may be used: This can involve repeating the same sequence or hopping to a different sequence in step 2, repeating the same spreading sequence or hopping to a different spreading sequence in step 3, or hopping to both a different sequence in step 2 and a different spreading sequence in step 3.

In some embodiments, one or more of steps 2, 3, 4(a), 4(b) are optional or omitted entirely. By using different sequences in step 2 or spreading sequences in step 3 or both, a pool of sequences can be generated.

Embodiment 1.4: Sequence multiplexing

Figure 6:
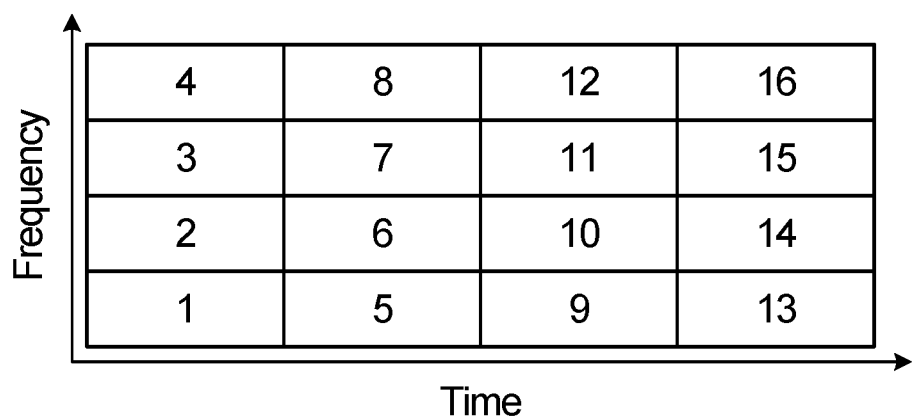
FIG. 6 is an example of a grid for resource grid based sequence assignment.

In this embodiment, the sequences in the pool are assigned to UEs. The following are three example options for UE specific sequence assignment:

Option 1: Assign UE specific root of ZC sequence;
Option 2: Assign cyclic shifts of the same root ZC sequence for a UE;
Option 3: Assign starting points and cyclic shifts of a given root of ZC sequence for a UE;

In some embodiments, sequence assignment is based on a resource grid. This involves partitioning a resource grid and assigning one or more than one sequence to each partition. A UE using a specific partition within the resource grid uses the sequences within that partition. An example of sequence assignment using this approach is depicted in FIG. 6. Here the resource grid has 16 partitions, and the number in each partition indicates the partition ID. The frequency dimension of one partition may be measured by one or several sub-carriers, or one or multiple resource blocks. The time dimension of one partition may be measured by one or several of OFDM symbols, slots, sub-frames, frames, etc. In the example of FIG. 6, The frequency dimension is divided into four, and the time dimension is divided into 4 to result in the 16 partitions.

In some embodiments, one partition is configured as a specific location within a frequency time resource grid, and partitions repeat based on the one configured partition covering the entire resource grid. A UE configured to transmit in a specific partition, use the sequences of that partition.

In a specific example, there are p=16 partitions and there is a sequence pool of size M=64. Each partition has $$\frac{M}{p} = 4$$

sequences. The number of partitions in the frequency dimension (m=4) can be based on a configuration of physical resources for a bandwidth part (BWP) and the number of partitions in time (n=4) is obtained by n=p/m. A UE that has the partition index will know the sequence(s) available for use for uplink transmission.

As one example, the partition index is RRC signaled, and a sequence index in the partition is obtained by mod(UE_ID, M/p). In another example, ACK, NACK, SR, Resumption requests, buffer indication, CSI can have different partitions and pools and be signaled/pre-configured. In some embodiments, an ACK pool size is $M_{ACK}$=64 and a NACK pool size is $M_{NACK}$=32.

Embodiment 1.5: Guard Period for Sequence Transmission

When transmissions are made by UEs in RRC_CONNECTED state, the UEs can be instructed when to transmit with a timing advance, such that their signals arrive at the BS/gNB within a window, and therefore appear to be synchronized.

Figure 7A:
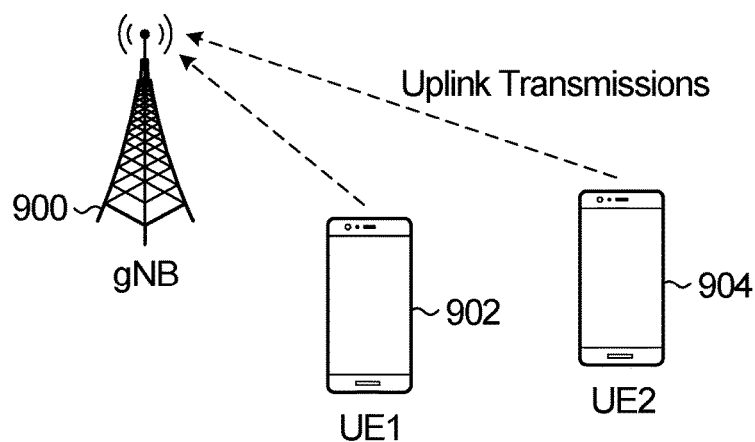
FIG. 7A depicts a network with multiple UEs at different distances from a base station.

Uplink transmission of UCI by a UE in an RRC_INACTIVE state using any of the embodiments described herein does not have the benefit of setting the timing advance, and therefore is asynchronous. The transmitted signals from UEs at different positions within the coverage area will be received at the gNB in different time instances. This can cause interference to the other transmissions within the cell coverage area. See for example, FIG. 7A, which shows a gNB 900, and two UEs 902, 904 in RRC_INACTIVE state. UE 902 is a different distance from gNB 900 than UE 904 and therefore the two UEs will have different times of arrival for transmitted signals.

In some embodiments, to avoid interference to other transmissions, a gap or guard period is introduced for the sequence transmission. Applying a gap/guard period for the sequence can be achieved by adjusting one or more parameters of the sequence, for example, symbol duration, number of symbols in the sequence, CP.

Figure 7B:
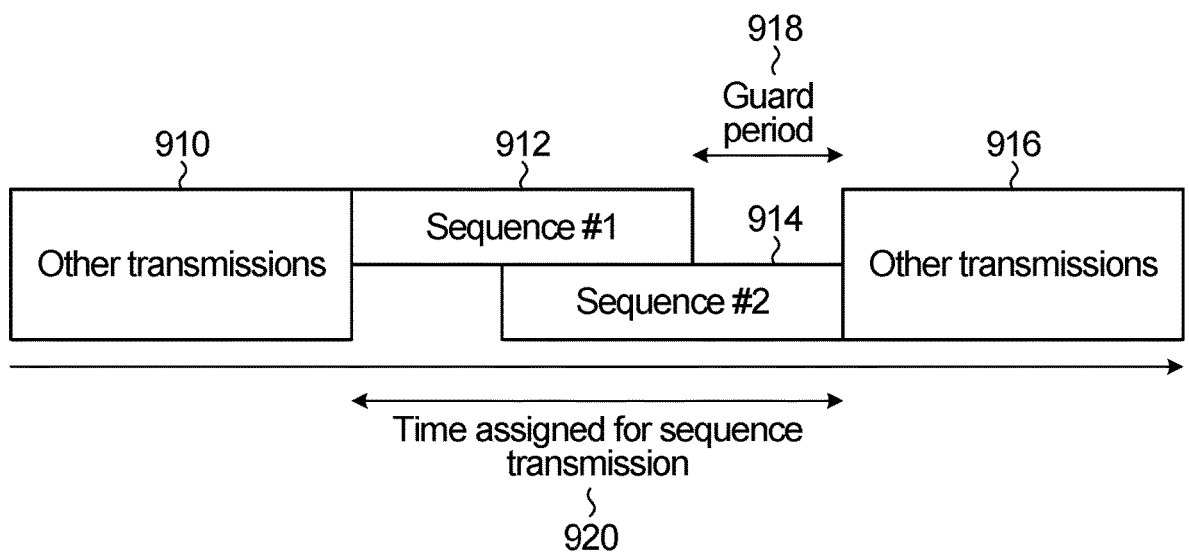
FIG. 7B depicts a guard period for sequence transmission.

FIG. 7B shows an example of the timing of sequence transmission with a gap for the purpose of avoiding interference. In FIG. 7B, time is along the horizontal axis. Other transmissions are occurring during time intervals 910,916. Between the transmissions is a time 920 assigned for sequence transmission. The time 920 assigned for sequence transmission is longer than the time needed to make a sequence transmission. In FIG. 7B, a first sequence 912 is received (e.g. from UE 902) and a second sequence 914 is received (e.g. from UE 904). The first sequence 912 is at the beginning of the time 920 assigned for sequence transmission and is followed by a guard period 918 that still is part of the time 920. Because the time 920 for sequence transmission 920 is longer than the time to transmit a sequence, even though sequence 914 is received later than sequence 912, it is still received in its entirety before other transmissions begin in time interval 916. Sequence 912 may or may not overlap in time partly with sequence 914. A guard time can be realized by assigning a particular length of a sequence that is shorter than the maximum length that could be transmitted using the allocated resources. For example, signalling can be transmitted by the network, and received by a UE, that configures a transmission resource within which to transmit the sequence, and the transmission resource has a time duration that is longer than a time duration to transmit the sequence. The UE may make its sequence transmission at the beginning of the transmission resource thereby resulting in a gap after sequence transmission.

Embodiment 1.6 Sequence Properties

Sequences can be used to convey UCI/PUCCH while attempting to minimize the interference to the other transmissions.

In some embodiments, the sequence used for UCI/PUCCH is transmitted using a different subcarrier spacing compared to other transmissions in the resource grid e.g. transmissions within an active BWP. For example, sequence subcarrier spacing can be a fraction of that used for other transmissions or a specified value in RRC signaling or DCI indication (Eg. Paging DCI).

Figure 8A:
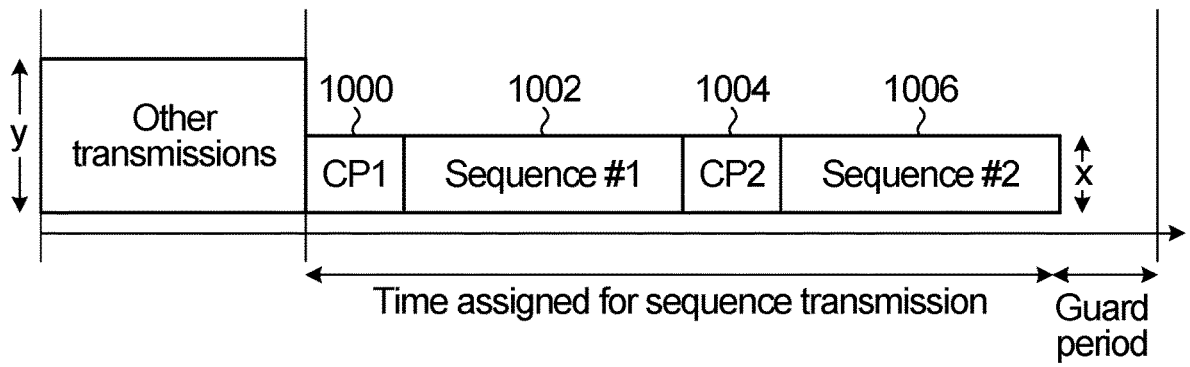
FIGS. 8A, 8B and 8C show examples of sequence properties.
Figure 8B:
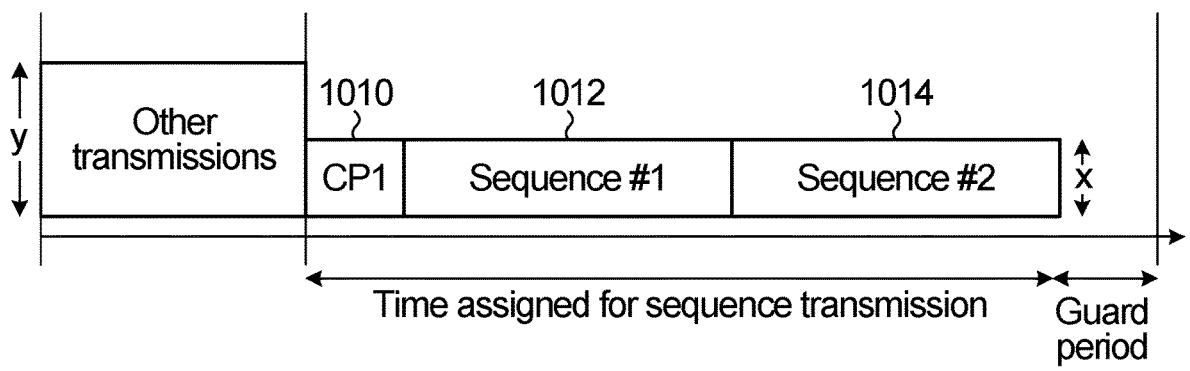
Figure 8C:
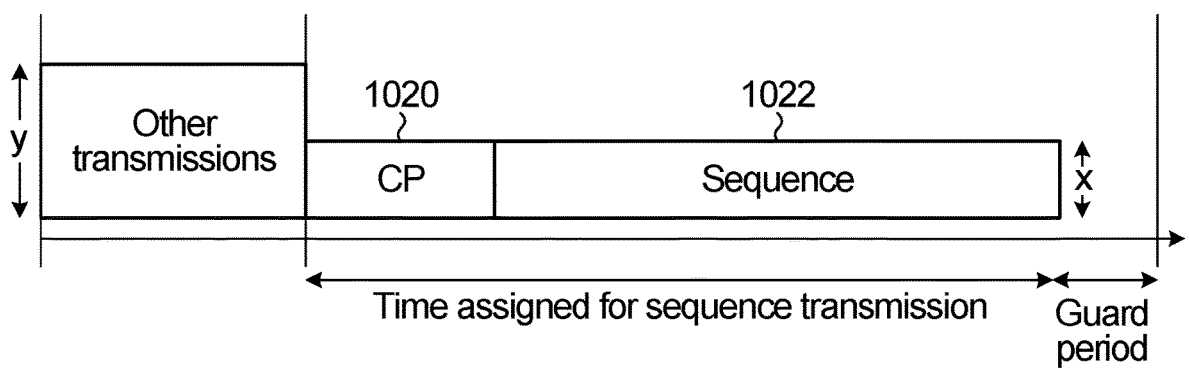

An OFDM symbol used to transmit a sequence is referred to below as a sequence symbol. One or multiple sequence symbols may be transmitted. Examples are shown in FIGS. 8A, 8B, 8C, where different subcarrier spacings x and y are used UCI sequence transmission and other transmissions respectively. The subcarrier spacings in each figure may be different, and the time scale may be different for the examples. In some embodiments, each sequence symbol transmission has its own CP, as depicted in FIG. 8A, referred to as format A. FIG. 8A shows CP1 1000, sequence symbol "Sequence #1" 1002, CP2 1004, sequence symbol "Sequence #2" 1006.

In some embodiments, each sequence transmission has its own CP, as depicted in FIG. 8B, referred to as format B; where multiple sequence symbols are transmitted, individual sequence symbols do not have their own CP. FIG. 8B shows CP1 1010, sequence symbol "Sequence #1" 1012, sequence symbol "Sequence #2" 1014.

Another example is shown in FIG. 8C, which shows a single CP 1020 and a single sequence symbol 1022.

As noted above, the time scale and subcarrier spacings may be different in the examples of FIGS. 8A, 8B and 8C. FIG. 8A is a resource grid format to define a sequence with larger carrier bandwidth with shorter time duration. FIG. 8B is a resource grid format to define a sequence with larger carrier bandwidth with shorter time duration compared to the format in FIG. 8C.

A benefit of the FIG. 8A format over the FIGS. 8B and 8C formats is that is sequence hopping can be employed, i.e., Sequence 1 1002 is different from Sequence 2 1006. Another benefit of the FIG. 8A format over the FIG. 8C format is that better mobility support. This may be realized by using a larger SCS for sequence transmission. A benefit of the FIG. 8B format over the FIG. 8A format is that a longer CP maybe used for the sequence as a whole, which results in better asynchronism or multi-path or large cell coverage. This is because a longer CP can mitigate the interference due to time offset (asynchronous transmission) or multi-path.

A benefit of the FIG. 8B format over the FIG. 8C format is better mobility support by larger SCS. A benefit of the FIG. 8C format over the FIG. 8A format is that a longer CP may be used for the single sequence symbol, which results in better asynchronism or multi-path or large cell coverage.

The benefit of the format of FIG. 8C over the format of FIG. 8B is larger sequence pool, which allows for more potential UEs and better TA estimation. This is because a larger sequence pool with desired properties can be defined using a longer sequence.

In FIGS. 8A, 8B and 8C, "Sequence 1" and "Sequence 2" represent the sequences from the pool/allowed sequences. They can be the same sequence used repeatedly (two or more than two times) or different sequences.

The sequence CP can be different. CP can be extended or normal CP per sequence. The CP may have a length that is a multiplier of CP of RRC configured or BWP configured value.

Sequence guard period: The duration of the sequences (including CP) transmission does not fill the entire transmission duration allocated for the transmission. This allows for a guard period and consequently, a better ability to mitigate over TA mismatch and/or uplink asynchronism.

Sequence transmission can take the entire slot, in which case, for example, the "other transmission" time in FIG. 8A to 8C within the slot is zero. A slot is a transmission opportunity defined in a time/frequency resource grid. Moreover, sequence transmission can occur in any location within a slot, for example, the start symbol position and end symbol position can be any value within a slot.

Figure 4:
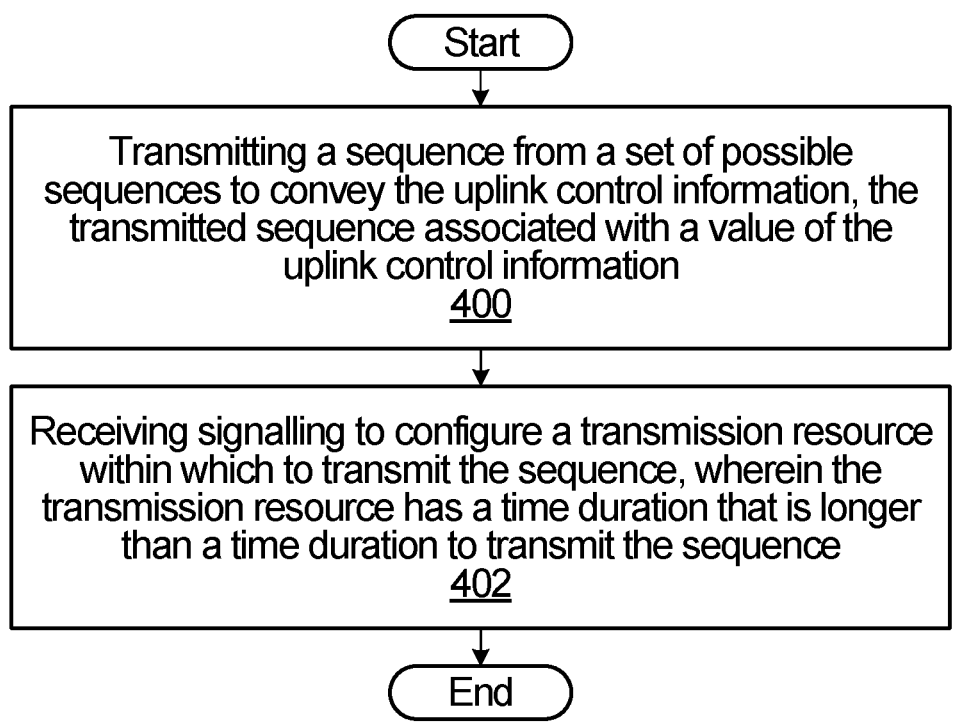
FIG. 4 is a flowchart of a method provided by an embodiment of the disclosure that features the use of sequences to transmit the UCI.

Referring now to FIG. 4, shown is a flowchart of a method of transmitting UCI provided by an embodiment of the disclosure that feature UCI transmission through the use of sequences. The method begins in block 400 with transmitting, by a UE, uplink control information while in RRC_INACTIVE state transmitting a sequence from a set of possible sequences to convey the uplink control information, the transmitted sequence associated with a value of the uplink control information. In some embodiments, block 402 is included which involves receiving signalling to configure a transmission resource within which to transmit the sequence, wherein the transmission resource has a time duration that is longer than a time duration to transmit the sequence. Block 402 is omitted in some embodiments.

Advantageously, flexible transmission formats for sequences help for robust performance and features.

Uplink Control Information Reporting Using PRACH Process

In this approach, upon DL data arrival to a UE, the UE (optionally) initiates a physical random access channel (PRACH) procedure. Note this PRACH procedure may be initiated on its own, or as part of a larger RRC resume procedure.

During such procedure, UCI is signaled to the network side. The procedures of using a PRACH on its own, or PRACH as part of RRC resume to transmit UCI, may or may not transition the UE to the RRC_CONNECTED state. In some embodiments, when a UE in RRC INACTIVE state is scheduled downlink data in a scheduling message (for example through DCI), the scheduling message also indicates to the UE which approach of RRC resumption procedure to follow and what type of uplink control information is to be signaled to the network side. In another example, when a UE requests a resumption (for example for uplink data transmission) UCI is embedded in such request. Which approach to resumption is to be performed and what UCI is to be transmitted may in accordance with a UE-specific configuration, a group of UE-specific configuration, or a cell-specific (i.e. all UEs in a cell).

An advantage of such a procedure is the flexibility to manage UEs in the cell because all UEs support such a resumption procedure and therefore, implementation and deployment of such a scheme is relatively straightforward. On the other hand, if a large number of UEs were to use such a process for UCI, a significantly large amount of resources will be required. However, such an approach may be still useful for a moderate number of UEs. In some embodiments, this approach is applied for some UEs, in combination with the use of one of the embodiments described previously, where the UE stays in RRC INACTIVE state, for other UEs. In other words, some UEs in a cell may use an approach that involves UCI signaling while staying in RRC INACTIVE state and some other UEs in the same cell may use a RRC resume/PRACH based approach. Such configuration may be cell specific or UE specific or RRC state specific.

Figure 2:
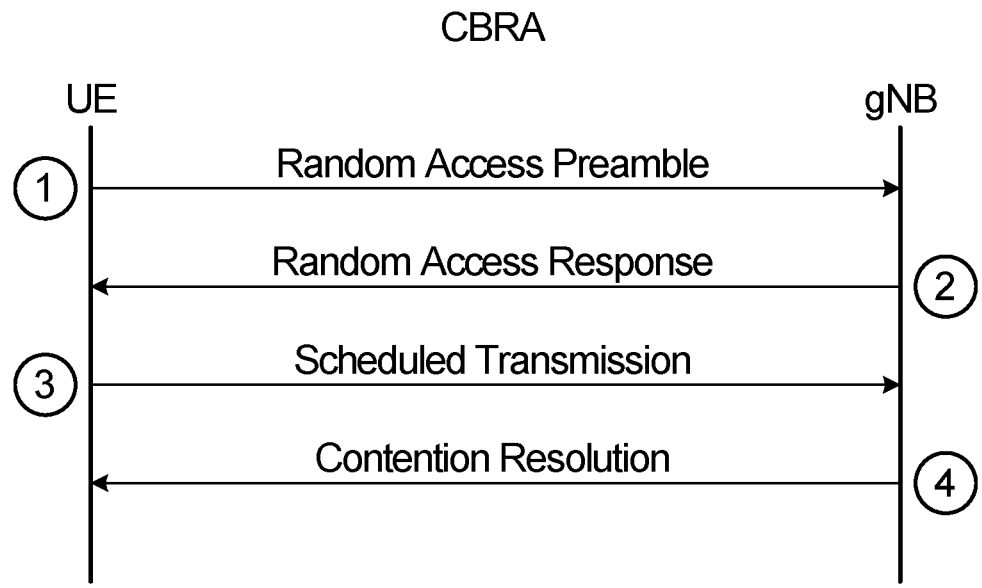
FIG. 2 is a flowchart of a contention based random access procedure.
Figure 3:
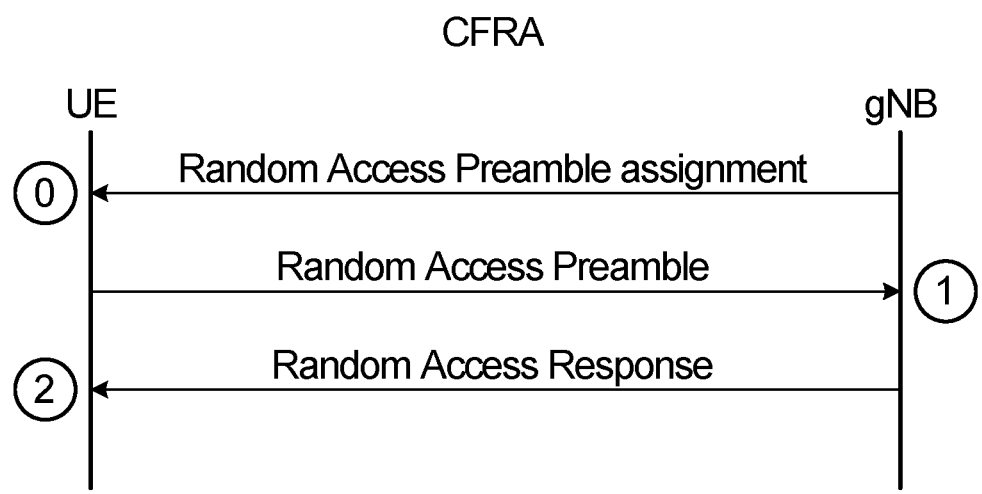
FIG. 3 is a flowchart of a contention-free random access procedure.

An existing contention based random access procedure involves the exchange of four messages and is depicted in FIG. 2. The messages include:

Message 1: UE transmits random access preamble;
Message 2: gNB responds with random access response;
Message 3: UE makes scheduled transmission; and
Message 4: gNB responds with contention resolution.

A two step procedure includes two messages referred to as Message A and Message B, namely:

Message A: UE transmits random access preamble; and
Message B: gNB responds with random access response;

Embodiment 2.1: UCI Using PRACH Process

In a first embodiment, upon receiving downlink data by a UE, the UE triggers a PRACH process (in part or in its entirety). Optionally, the UE triggers PRACH and transitions to RRC_CONNECTED state.

Alternatives for Triggering PRACH for UCI Transmission

Four alternatives for when the UE triggers PRACH based on this approach include:

Alternative 1: in a first alternative, a UE triggers PRACH and transitions to RRC_CONNECTED state for every DL data reception;
Alternative 2: in a second alternative, a UE triggers PRACH and transitions to RRC_CONNECTED state only when DL data scheduling indicates;
Alternative 3: in a third alternative, a UE triggers PRACH and transitions to RRC_CONNECTED state only when DL data informs the trigger indication;
Alternative 4: in a fourth alternative, a UE triggers PRACH and transitions to RRC_CONNECTED state when DL data is of certain size (for example above a threshold x bits of DL data triggers PRACH), and otherwise the UE stays in RRC_INACTIVE state.

Options for the UE to transmit ACK/NACK of the downlink data include:
Option 1: A UE triggers PRACH using a specific sequence that is configured. This may include one sequence used as a random access preamble to indicate an ACK and a different sequence is used as a random access preamble to indicate a NACK.
Option 2: A UE triggers PRACH and in message 3 of the four step RACH procedure, the UE includes the ACK/NACK information. Alternatively, the UE triggers PRACH, and in message B of the two step procedure, the UE includes the ACK/NACK.
Option 3: A UE triggers PRACH and transmits ACK/NACK after establishing a PUCCH.

An advantage of these approaches is that existing PRACH mechanism is utilized for UCI which is less complex for implementation/deployment.

Various detailed examples of how PRACH processes can be used to transmit UCI will now be described. These examples are described assuming that the UCI to be transmitted includes ACK and/or NACK. However, similar to the embodiments described above, the UCI may be transmitted in this manner that includes ACK/NACK indication, and possibly one or more of SR requests, CSI, Channel quality, UE buffer states etc. In addition, the actual triggering of the use of any of these PRACH procedures to transmit UCI may occur, for example, based on one of the four alternatives set out above.

Embodiment 2.2: ACK/NACK with RACH Process

In this embodiment, PRACH is used for HARQ ACK/NACK indication.
Alternative 1: in a first alternative, ACK/NACK feedback is achieved using a some or all of the 4-step RACH procedure. The first two steps in this alternative are:
Step 1: DL data transmission in RRC_INACTIVE state
Step 2: DL data decoding by the UE.
Subsequent steps: There are two alternatives for the subsequent steps in Alternative 1 in Embodiment 2.2, referred to as Subsequent Steps Alternative 1-1 and Subsequent Steps Alternative 1-2 in the description below Subsequent Steps Alternative 1-1: in this alternative, only NACK feedback is transmitted. If decoding was successful, no action is taken by the UE. If decoding was not successful, the UE initiates 4-step RACH. Only a single preamble is used in the process by the UE. The preamble can be UE specific (provided to UE, for example configured by RRC signaling during RRC_CONNECTED state or during suspension procedure etc.) or can be selected randomly by the UE from a pool of preamble sequences. Following this, Alternative 1-1-1 or Alternative 1-1-2 may be followed.

Alternative 1-1-1: If the BS/gNB detects the UE-specific preamble of the UE, it realizes that the DL transmission was unsuccessful. Following this, Alternative 1-1-1-1, Alternative 1-1-1-2, or Alternative 1-1-1-3 may be followed.
Alternative 1-1-1-1: Using message 2 of the CBRA procedure, the BS/gNB asks the UE to stay in RRC_INACTIVE state or to transition to RRC_CONNECTED state (this would involve a new Message 2 Format)
Alternative 1-1-1-2: the UE autonomously stays in the RRC_INACTIVE state after CBRA message 1 or 2; in other words, the UE does not follow the rest of 4-step RACH process
Alternative 1-1-1-3: the UE follows the 4-step RACH process and transitions to the RRC_CONNECTED state (normal 4-step RACH).

Alternative 1-1-2: in this alternative, the UE transmits a NACK in CBRA Message 3. Following this, Alternative 1-1-2-1, Alternative 1-1-2-2, or Alternative 1-1-2-3 may be followed.
Alternative 1-1-2-1: Using CBRA message 4, the BS/gNB indicate the UE to stay in RRC_INACTIVE state or to transition to RRC_CONNECTED state (a Msg4 Format with state transition indication)
Alternative 1-1-2-2: the UE autonomously stays in the RRC_INACTIVE state after MSG 3 or 4 (UE does not follow the rest of 4-step RACH process)
Alternative 1-1-2-3: the UE follows the 4-step RACH process and transitions to the RRC_CONNECTED state (normal/regular 4-step RACH).

Subsequent Steps Alternative 1-2: in this alternative, ACK and NACK feedback is transmitted. In both cases, following DL data decoding, the UE initiates 4-step RACH. Following this, Alternative 1-2-1 or Alternative 1-2-2 may be followed.
Alternative 1-2-1: the UE initiates 4-step RACH using one of two UE-specific preambles, one for ACK and the other for NACK. If the BS/gNB detects the UE-specific preamble of the UE that indicates NACK, it realizes that the DL transmission was unsuccessful. The two UE-specific preambles may, for example, be configured by higher layers while in RRC_CONNECTED state or during a suspension procedure. Alternatively, they can be selected randomly by the UE from a pool of preamble sequence pairs or a pair of pools of preamble sequences. Following this, Alternative 1-2-1-1, Alternative 1-2-1-2, or Alternative 1-2-1-3 may be followed.
Alternative 1-2-1-1: Using CBRA message 2, the BS/gNB asks the UE to stay in RRC_INACTIVE state or transition to RRC_CONNECTED state (this involves a new message 2 Format)
Alternative 1-2-1-2: The UE autonomously stays in the RRC_INACTIVE state after CBRA message 1 or 2; the UE does not follow the rest of 4-step RACH process
Alternative 1-2-1-3: the UE follows the 4-step RACH process and transitions to the RRC_CONNECTED state (normal 4-step RACH)

Alternative 1-2-2: in this alternative, the UE transmits ACK/NACK in CBRA message 3. A single RACH preamble is used by the UE to initiate RACH for this purpose. The preamble can be UE specific (provided to UE, for example configured by higher layers while in RRC_CONNECTED state or during a suspension procedure) or can be selected randomly by the UE from a pool of preamble sequences. Following this, Alternative 1-2-2-1, Alternative 1-2-2-2, or Alternative 1-2-2-3 may be followed.

Alternative 1-2-2-1: Using Msg4., BS/gNB asks the UE to stay in RRC_INACTIVE state or transition to RRC_CONNECTED state (indication is provided in Msg4 Format)

Alternative 1-2-2-2: UE autonomously stays in the RRC_INACTIVE state after MSG 3 or 4 (UE does not follow the rest of 4-step RACH process)

Alternative 1-2-2-3: UE follows the 4-step RACH process and transitions to the RRC_CONNECTED state (normal/regular 4-step RACH)

Alternative 2: in this alternative, ACK and/or NACK UCI is transmitted using a 2-step RACH procedure. The first two steps for this alternative are:

Step 1: DL data transmission in RRC_INACTIVE state
Step 2: DL data decoding by the UE.

Subsequent steps: There are two alternatives for the subsequent steps in Alternative 2, referred to as Subsequent Steps Alternative 2-1 and Subsequent Steps Alternative 2-2 in the description below Subsequent Steps Alternative 2-1: in this alternative, only NACK feedback is transmitted. If decoding was successful, no action is taken by the UE. If decoding was not successful, the UE initiates 2-step RACH. Only a single preamble is used in the process by the UE. Preamble can be UE specific (provided to UE, for example configured by higher layers while in RRC_CONNECTED state or during suspension procedure) or can be selected randomly by the UE from a pool of preamble sequences. Following this, Alternative 2-1-1 or Alternative 2-1-2 may be followed.

Alternative 2-1-1: If the BS/gNB detects the UE-specific preamble of the UE, it realizes that the DL transmission was unsuccessful.

Alternative 2-1-2: in this alternative, the NACK is transmitted in the data part of CBRA message A The following alternatives are common to both Alternative 2-1-1 and 2-1-2:

Alternative 2-1-x-1: Using CBRA message B, the BS/gNB asks the UE to stay in RRC_INACTIVE state or to transition to RRC_CONNECTED state (this involves a modified message B format). Here x indicates both Alternatives 2-1-1 and 2-1-2.

Alternative 2-1-x-2: the UE autonomously stays in the RRC_INACTIVE state after message A or B; in this case, the UE does not follow the rest of 2-step RACH process. Here x indicates both Alternatives 2-1-1 and 2-1-2.

Alternative 2-1-x-3: UE follows the 2-step RACH process and transitions to the RRC_CONNECTED state; in this case, the UE completes the normal 2-step RACH process. Here x indicates both Alternatives 2-1-1 and 2-1-2.

Subsequent Steps Alternative 2-2: with this alternative, the UE transmits ACK/NACK feedback using 2-step RACH.

Alternative 2-2-1: in this alternative, the UE initiates 2-step RACH using one of two preambles, one for ACK, and the other for NACK. If the BS/gNB detects the UE-specific preamble of the UE for NACK, it realizes that the DL transmission was unsuccessful. A UE specific pair may be provided to UE, for example configured by higher layers while in RRC_CONNECTED state or during suspension procedure etc., or can be selected randomly by the UE from a pool of preamble sequence pairs or a pair of pools of preamble sequences.

Alternative 2-2-2: in this alternative, the UE transmits the ACK/NACK feedback in the data part of MSG A of the CBRA procedure. A single preamble is used by the UE. The preamble can be UE specific (provided to UE, for example configured by higher layers while in RRC_CONNECTED state or during suspension procedure etc.) or can be selected randomly by the UE from a pool of preamble sequences. The preamble is used to indicate the message contains UCI. The actual UCI (e.g. ACK/NACK) is contained in other parts of the message.

Common to both Alternative 2-2-1 and Alternative 2-2-2:

Alternative 2-2-x-1: Using CBRA message B, BS/gNB asks the UE to stay in RRC_INACTIVE state or transition to RRC_CONNECTED state (this involves a modified message B Format). Here x indicates both Alternatives 2-2-1 and 2-2-2.

Alternative 2-2-x-2: UE autonomously stays in the RRC_INACTIVE state after message A or B; in this case, the UE does not follow the rest of 2-step RACH process. Here x indicates both Alternatives 2-2-1 and 2-2-2.

Alternative 2-2-x-3: UE follows the 2-step RACH process and transitions to the RRC_CONNECTED state, thereby completing the rest of a normal 2-step RACH. Here x indicates both Alternatives 2-2-1 and 2-2-2.

Figure 9:
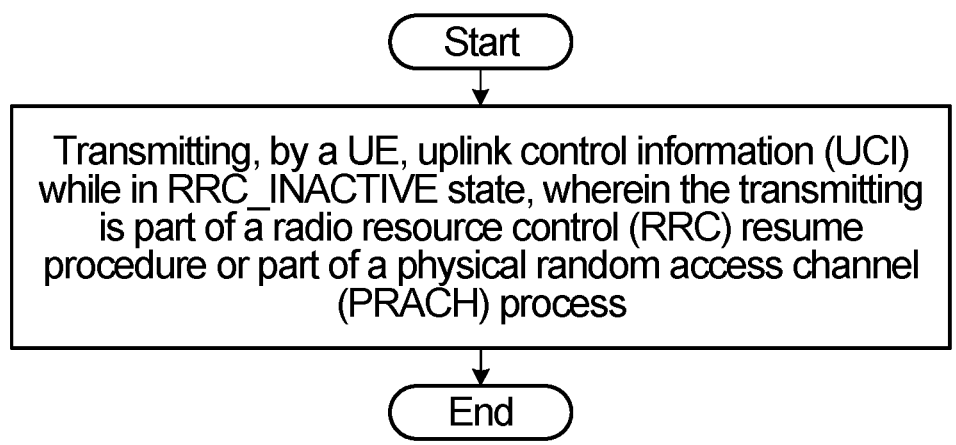
FIG. 9 is a flowchart of a method provided by an embodiment of the disclosure that features the use of PRACH procedures to transmit the UCI.

Referring now to FIG. 9, shown is a flowchart of a method of transmitting UCI provided by an embodiment of the disclosure that features the use of PRACH procedures to transmit the UCI.11. In block 900, a UE transmits uplink control information (UCI) while in RRC_INACTIVE state, wherein the transmitting is part of a radio resource control (RRC) resume procedure or part of a physical random access channel (PRACH) process.

An advantage of these embodiments is that an existing RACH process can be used for UCI/HARQ purposes.

Sidelink Embodiment

Although the embodiments described are focused on the transmission of uplink control information from a user equipment to a network, a similar approach may be applied for the transmission of sidelink control information in respect of sidelink communications between two UEs.

Figure 10:
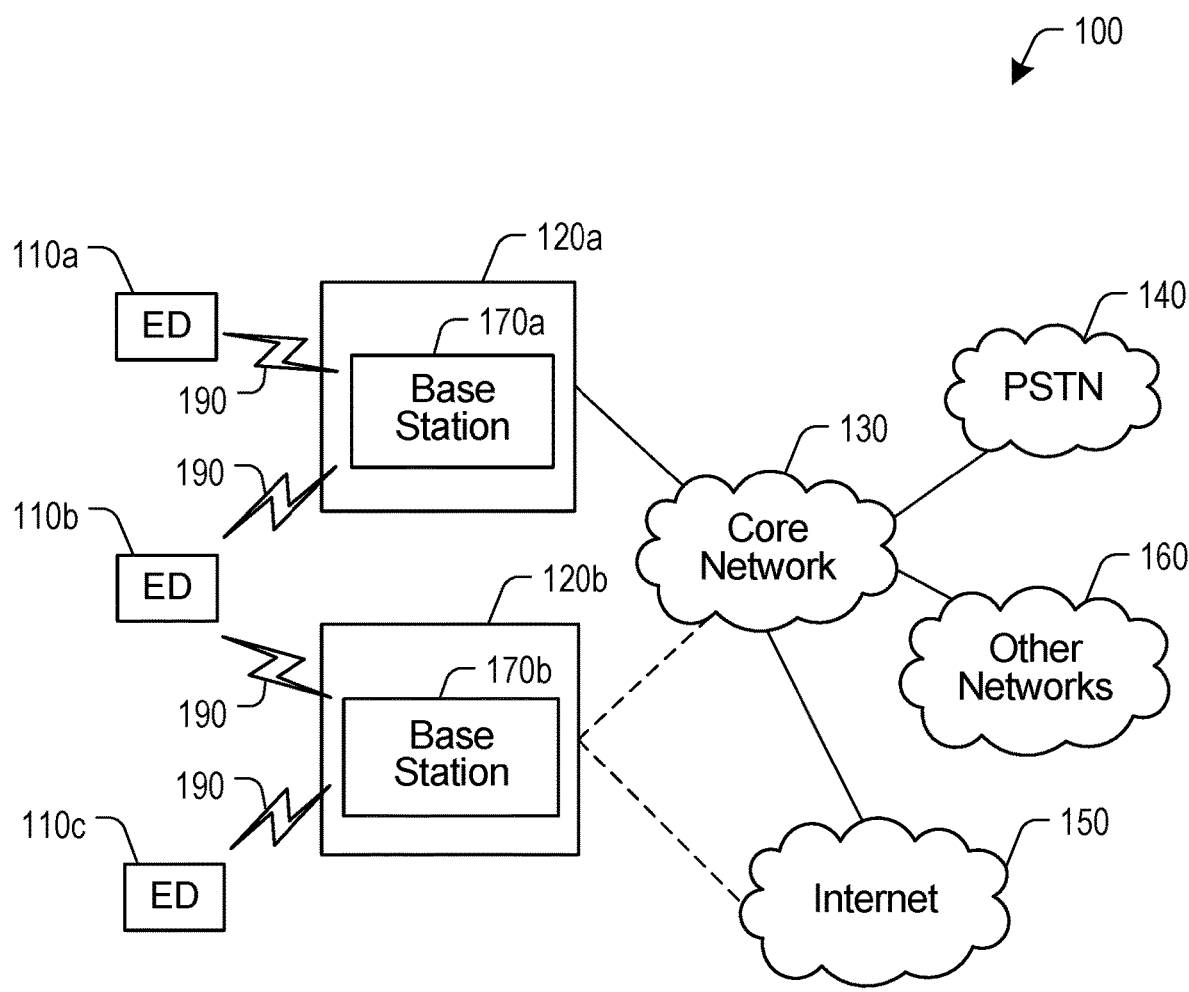
FIG. 10 shows an example of a network for implementing one or more embodiments of the disclosure.

FIG. 10 illustrates an example communication system 100 in which embodiments of the present disclosure may be implemented. In general, the communication system 100 enables multiple wireless or wired elements to communicate data and other content. The purpose of the communication system 100 may be to provide content (voice, data, video, text) via broadcast, narrowcast, user device to user device, etc. The communication system 100 may operate by sharing resources such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 10, any reasonable number of these components or elements may be included in the communication system 100.

The EDs 110a-110c are configured to operate, communicate, or both, in the communication system 100. For example, the EDs 110a-110c are configured to transmit, receive, or both via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 10, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission point (TP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The communication system 100 may include RANs, such as RAN 120b, wherein the corresponding base station 170b accesses the core network 130 via the internet 150, as shown. The detailed embodiments described herein make reference to TPs, but more generally, any type of base station can be used for any of the embodiments described herein.

The EDs 110a-110c and base stations 170a-170b are examples of communication equipment that can be configured to implement some or all of the functionality and/or embodiments described herein. In the embodiment shown in FIG. 10, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RANs 120a-120b shown is one example only. Any number of RANs may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more channel access methods, such as code division multiple access (CDMA), time division multiple access (TDMA), frequency division multiple access (FDMA), orthogonal frequency division multiple access (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as HSPA, HSPA+ optionally including HSDPA, HSUPA or both. Alternatively, a base station 170a-170b may establish an air interface 190 with Evolved UTMS Terrestrial Radio Access (E-UTRA) using LTE, LTE-A, LTE-B and/or New Radio (NR). It is contemplated that the communication system 100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160). In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as IP, TCP, UDP. EDs 110a-110c may be multimode devices capable of operation according to multiple radio access technologies, and incorporate multiple transceivers necessary to support such.

Figure 11A:
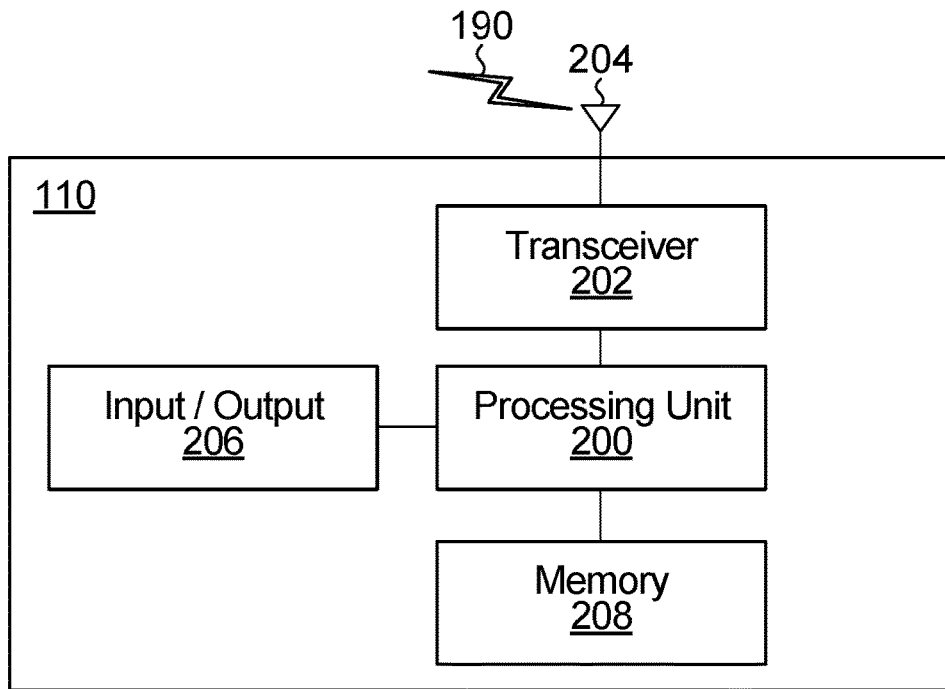
FIG. 11A is a block diagram of an example electronic device.
Figure 11B:
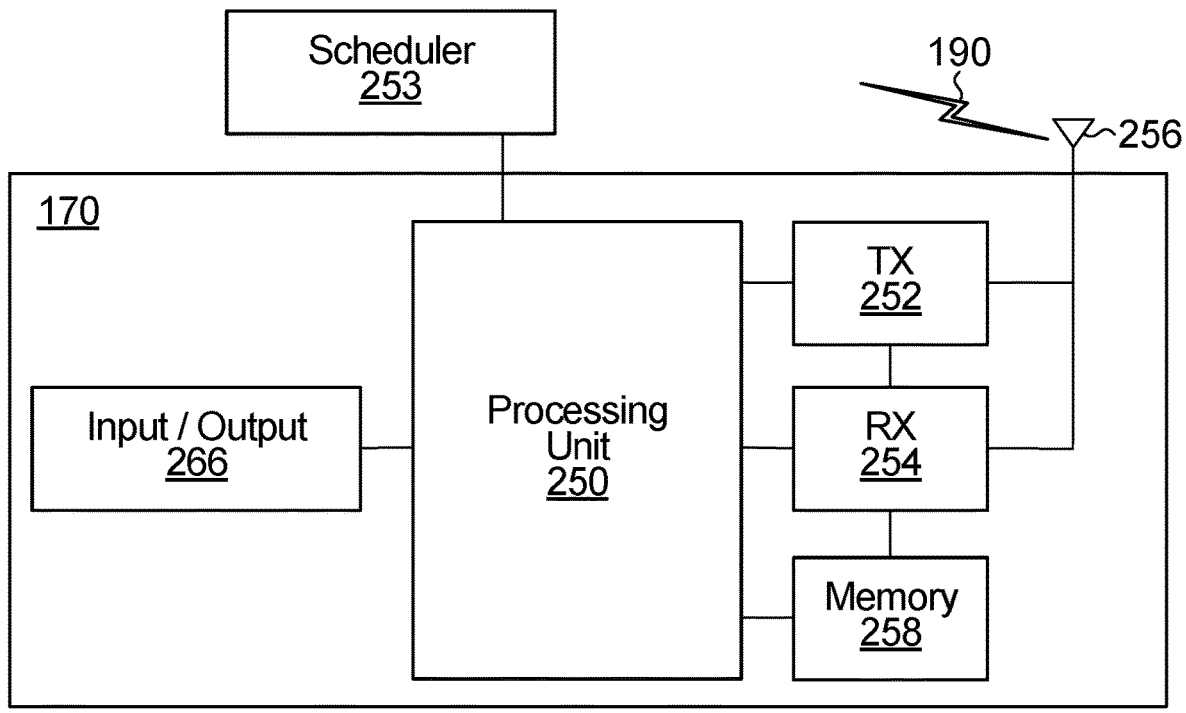
FIG. 11B is a block diagram of an example electronic device.

FIG. 11A and FIG. 11B illustrate example devices that may implement the methods and teachings according to this disclosure. In particular, FIG. 11A illustrates an example ED 110, and FIG. 11B illustrates an example base station 170. These components could be used in the communication system 100 or in any other suitable system. For example, the ED of FIG. 11A may implement the functionality of FIG. 4 and/or that of FIG. 5. The base station of FIG. 11B may implement the functionality of FIG. 4 and/or that of FIG. 5.

As shown in FIG. 11A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail above. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described above and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 11B, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

Additional details regarding the EDs 110 and the base stations 170 are known to those of skill in the art. As such, these details are omitted here for clarity. Numerous modifications and variations of the present disclosure are possible in light of the above teachings. It is therefore to be understood that within the scope of the appended claims, the disclosure may be practiced otherwise than as specifically described herein.

The invention claimed is:

1. A method comprising:
receiving, by a user equipment (UE), a control message that releases the UE from the RRC_CONNECTED state, the control message comprising configuration information for conveying acknowledgment/negative acknowledgment (ACK/NACK) feedback in an RRC_INACTIVE state;
entering, by the UE, into the RRC_INACTIVE state from RRC_CONNECTED state;
transmitting, by the UE, in accordance with said configuration information,
a symbol sequence from a set of possible symbol sequences to convey the ACK/NACK feedback.

2. The method of claim 1 further comprising:
receiving signalling to configure a transmission resource within which to transmit the symbol sequence, wherein the transmission resource has a time duration that is longer than a time duration to transmit the symbol sequence.

3. The method of claim 1 the method further comprising:
receiving, by the user equipment (UE) a downlink data transmission while in RRC_INACTIVE state;
wherein transmitting the symbol sequence from the set of possible sequences comprises:
transmitting a symbol sequence to indicate a NACK in respect of the downlink data transmission that is not correctly decoded; or
transmitting a symbol sequence to indicate an ACK in respect of the downlink data transmission that is correctly decoded; or
transmitting a first symbol sequence to indicate a NACK in respect of the downlink data transmission is not correctly decoded and transmitting a second symbol sequence to indicate an ACK in respect of the downlink data transmission is correctly decoded.

4. The method of claim 1, wherein the configuration information is one of:
UE-specific;
Cell-specific; or
UE-group-specific.

5. The method of claim 1 wherein the ACK/NACK feedback consists of m bits, the method further comprising determining the symbol sequence by:
modulating the m bits to produce a modulated symbol;
multiplying the modulated symbol with a first sequence to obtain a first set of complex valued symbols; and block-wise spreading the first set of complex valued symbols with a first spreading sequence.

6. The method of claim 5, wherein the symbol sequence is a first symbol sequence, and the method further comprising:
transmitting, within a same slot of the first symbol sequence, a second symbol sequence determined from the ACK/NACK feedback, wherein the second symbol sequence is:
the same as the first symbol sequence; or
determined by multiplying the modulated symbol with a second sequence different from the first sequence to obtain a second set of complex valued symbols, and block- wise spreading the second set of complex valued symbols with said first spreading sequence; or
determined by block-wise spreading the first set of complex valued symbols with a second spreading sequence that is different from the first spreading sequence; or
determined by multiplying the modulated symbol with a second sequence different from the first sequence to obtain a second set of complex valued symbols, and block- wise spreading the second set of complex valued symbols with a second spreading sequence that is different from said first spreading sequence.

7. The method of claim 1 further comprising:
receiving signalling indicating a resource partition, the resource partition having an associated set of symbol sequences;
wherein transmitting the symbol sequence comprises transmitting a symbol sequence selected from the associated set of symbol sequences based on a UE identifier of the UE.

8. The method of claim 1 further comprising:
transmitting the symbol sequence with a subcarrier spacing different from other transmissions in a same resource grid, wherein the subcarrier spacing is a spacing between consecutive OFDM subcarriers.

9. An apparatus comprising:
a processor and a memory, wherein the apparatus is configured to:
receiving a control message that releases the UE from the RRC_CONNECTED state, the control message comprising configuration information for conveying acknowledgment/negative acknowledgment (ACK/NACK) feedback in an RRC_INACTIVE state;
entering into the RRC_INACTIVE state from RRC_CONNECTED state;
transmit, in accordance with said configuration, a symbol sequence from a set of possible symbol sequences to convey the ACK/NACK.

10. The apparatus of claim 9 further configured to receive signalling to configure a transmission resource within which to transmit the symbol sequence, wherein the transmission resource has a time duration that is longer than a time duration to transmit the symbol sequence.

11. The apparatus of claim 9 the apparatus further configured to receive a downlink data transmission while in RRC_INACTIVE state;
wherein the apparatus is configured to transmit the symbol sequence from the set of possible sequences, by:
transmitting a symbol sequence to indicate a NACK in respect of the downlink data transmission that is not correctly decoded; or
transmitting a symbol sequence to indicate an ACK in respect of the downlink data transmission that is correctly decoded; or
transmitting a first symbol sequence to indicate a NACK in respect of the downlink data transmission is not correctly decoded and transmitting a symbol second sequence to indicate an ACK in respect of the downlink data transmission is correctly decoded.

12. The apparatus of claim 9, wherein the configuration information is one of:
UE-specific;
Cell specific;
UE-group specific.

13. The apparatus of claim 9 wherein said ACK/NACK feedback consists of m bits, the apparatus further configured to determine the symbol sequence by:
modulating the m bits to produce a modulated symbol;
multiplying the modulated symbol with a first sequence to obtain a first set of complex valued symbols; and
block-wise spreading the first set of complex valued symbols with a first spreading sequence.

14. The apparatus of claim 13, wherein the symbol sequence is a first symbol sequence, and the method further configured to:
transmit, within a same slot of the first symbol sequence, a second symbol sequence determined from the ACK/NACK feedback, wherein the second symbol sequence is:
the same as the first symbol sequence; or
determined by multiplying the modulated symbol with a second sequence different from the first sequence to obtain a second set of complex valued symbols, and block-wise spreading the second set of complex valued symbols with said first spreading sequence; or
determined by block-wise spreading the first set of complex valued symbols with a second spreading sequence that is different from the first spreading sequence; or
determined by multiplying the modulated symbol with a second sequence different from the first sequence to obtain a second set of complex valued symbols, and block-wise spreading the second set of complex valued symbols with a second spreading sequence that is different from said first spreading sequence.

15. The apparatus of claim 9 further configured to receive signalling indicating a resource partition, the resourced partition having an associated set of symbol sequences;
wherein transmitting the symbol sequence comprises transmitting a symbol sequence from the associated set of symbol sequences based on a UE identifier of the UE.

16. The apparatus of claim 9 further configured to transmit the symbol sequence with a subcarrier spacing different from other transmissions in a same resource grid, wherein the subcarrier spacing is a spacing between consecutive OFDM subcarriers.

17. A method comprising:
receiving, by a user equipment (UE), a control message that releases the UE from the RRC_CONNECTED state, the control message comprising configuration information for conveying a scheduling request in an RRC_INACTIVE state;
entering, by the UE, into the RRC_INACTIVE state from RRC_CONNECTED state;
transmitting, by the UE, in accordance with said configuration information, a symbol sequence from a set of possible symbol sequences to convey the scheduling request.

18. The method of claim 13, wherein the control message further comprises configuration information for conveying acknowledgment/negative acknowledgment (ACK/NACK) feedback in the RRC_INACTIVE state.

19. An apparatus comprising:
- a processor and a memory, wherein the apparatus is configured to:
- receive, by the apparatus, a control message that releases the apparatus from the RRC_CONNECTED state, the control message comprising configuration information for conveying a scheduling request in an RRC_INACTIVE state;
- entering, by the apparatus, into the RRC_INACTIVE state from RRC_CONNECTED state;
- transmitting, by the apparatus, in accordance with said configuration information, a symbol sequence from a set of possible symbol sequences to convey the scheduling request.

20. The apparatus of claim 19, wherein the control message further comprises configuration information for conveying acknowledgment/negative acknowledgment (ACK/NACK) feedback in the RRC_INACTIVE state.

* * * * *